United States Patent [19]
Shiota et al.

[11] Patent Number: 6,073,120
[45] Date of Patent: Jun. 6, 2000

[54] AUTOMATIC DEALING APPARATUS

[75] Inventors: Takuji Shiota; Midori Fukai; Takeo Asawa; Akihiro Iwazaki; Mutsuko Sugiyama, all of Kawasaki, Japan

[73] Assignee: Fujitsu Limited, Kawasaki, Japan

[21] Appl. No.: 09/015,335

[22] Filed: Jan. 29, 1998

[30] Foreign Application Priority Data

Jul. 8, 1997 [JP] Japan .................................. 9-182881

[51] Int. Cl.[7] .................................................... G06G 3/00
[52] U.S. Cl. ............................................. 705/43; 235/379
[58] Field of Search ............................ 235/279; 341/23; 434/118, 307, 323; 345/173, 176; 705/43

[56] References Cited

U.S. PATENT DOCUMENTS

| 5,010,238 | 4/1991 | Kadono et al. ......................... 235/379 |
| 5,880,444 | 3/1999 | Shibata et al. ......................... 235/379 |

FOREIGN PATENT DOCUMENTS

| 7-230269 | 8/1995 | Japan . |
| 7-230515 | 8/1995 | Japan . |
| 7-296086 | 11/1995 | Japan . |
| 7-319974 | 12/1995 | Japan . |

*Primary Examiner*—Thomas R. Peeso
*Attorney, Agent, or Firm*—Staas & Halsey LLP

[57] ABSTRACT

According to an automatic dealing apparatus of the present invention, a control unit causes a display device to display a dealing screen of a dealing corresponding to a request from a user. An operation procedure indicator structured by arranging input data columns showing input items in sequence of inputs, is displayed substantially over the entire dealing screen displayed on the display device. The control unit, when any one of the input items is inputted from the input device, has the operation screen of a classification corresponding to this input item displayed in superposition on the operation procedure indicator displayed on the dealing screen.

32 Claims, 34 Drawing Sheets

FIG. 7

MONEY TRANSFER | CANCELLATION

| REMITTEE | | | |
|---|---|---|---|
| 1 | TRANSFER DESTINATION FINANCIAL INSTITUTE | | |
| 2 | NAME OF TRANSFER DESTINATION BRANCH OFFICE | | |
| 3 | ACCOUNT NUMBER | ( ) | |
| 4 | NAME OF RECIPIENT | | |

| AMOUNT OF MONEY | | | |
|---|---|---|---|
| 5 | AMOUNT OF MONEY FOR TRANSFER | YEN | CHARGE YEN |

| CLIENT | | |
|---|---|---|
| 6 | NAME OF CLIENT | |
| 7 | TELEPHONE NUMBER | |

FIG.8

MONEY TRANSFER

| | | | CANCELLATION |
|---|---|---|---|
| REMITTEE | | | |
| 1 | TRANSFER DESTINATION FINANCIAL INSTITUTE | | |
| 2 | NAME OF TRANSFER DESTINATION BRANCH OFFICE | | |
| 3 | ACCOUNT NUMBER | ( ) | |
| 4 | NAME OF RECIPIENT | | |
| AMOUNT OF MONEY | | | |
| 5 | AMOUNT OF MONEY FOR TRANSFER | YEN | CHARGE YEN |
| CLIENT | | | |
| 6 | NAME OF CLIENT | | |
| 7 | TELEPHONE NUMBER | | |

FIG.13

MONEY TRANSFER

| REMITTEE | | | |
|---|---|---|---|
| 1 | TRANSFER DESTINATION FINANCIAL INSTITUTE | BANK OF FUJITSU | MODIFICATION |
| 2 | NAME OF TRANSFER DESTINATION BRANCH OFFICE | MUSASHI NAKAHARA BRANCH OFFICE | MODIFICATION |
| 3 | ACCOUNT NUMBER | ( ORDINARY )  1 2 3 4 5 6 7 | MODIFICATION |
| 4 | | | MODIFI- |

"PLEASE INPUT ACCOUNT NUMBER OF TRANSFER DESTINATION"

| 5 | AMOUNT OF MONEY FOR TRANSFER | 100,000 YEN | CHARGE | 421 YEN | MODIFICATION |

| CL | | | |
| 6 | 1 | 2 | 3 |
| 7 | 4 | 5 | 6 |

RETURN

FIG.14

MONEY TRANSFER

REMITTEE

| | | | |
|---|---|---|---|
| 1 | TRANSFER DESTINATION FINANCIAL INSTITUTE | BANK OF "___" | MODIFICATION |
| 2 | NAME OF TRANSFER DESTINATION BRANCH OFFICE | MUSASHI NAKAHARA BRANCH OFFICE | MODIFICATION |
| 3 | ACCOUNT NUMBER | ( ORDINARY )  1 2 3 4 5 6 7 | MODIFICATION |
| 4 | NAME OF RECIPIENT | HANAKO YAMADA | MODIFICATION |

AMOUNT OF MONEY

| | | | | | |
|---|---|---|---|---|---|
| 5 | AMOUNT OF MONEY FOR TRANSFER | 100,000 YEN | CHARGE | 421 YEN | MODIFICATION |

CLIENT

| | | | |
|---|---|---|---|
| 6 | NAME OF CLIENT | TARO YAMADA | MODIFICATION |
| 7 | TELEPHONE NUMBER | 0123-456-7890 | MODIFICATION |

PLEASE CONFIRM THE CHARGE AND, IF CORRECT, PUSH "CONFIRMATION" KEY

CANCELLATION

CONFIRMATION

FIG.15 (a)

|   | | | |
|---|---|---|---|
| MONEY TRANSFER | | | 101 |
| 2 | NAME OF TRANSFER DESTINATION BRANCH OFFICE | | MODIFI-CATION — 87b |
| | | | RETURN — 102 |
| | | | — 84 |

FIG.15 (b)

|   | | | |
|---|---|---|---|
| MONEY TRANSFER | | | 101 |
| 1 | TRANSFER DESTINATION FINANCIAL INSTITUTE | BANK OF "----", | MODIFI-CATION — 87a |
| 2 | NAME OF TRANSFER DESTINATION BRANCH OFFICE | | RETURN |
| | | | 102 — 87b |
| | | | — 84 |

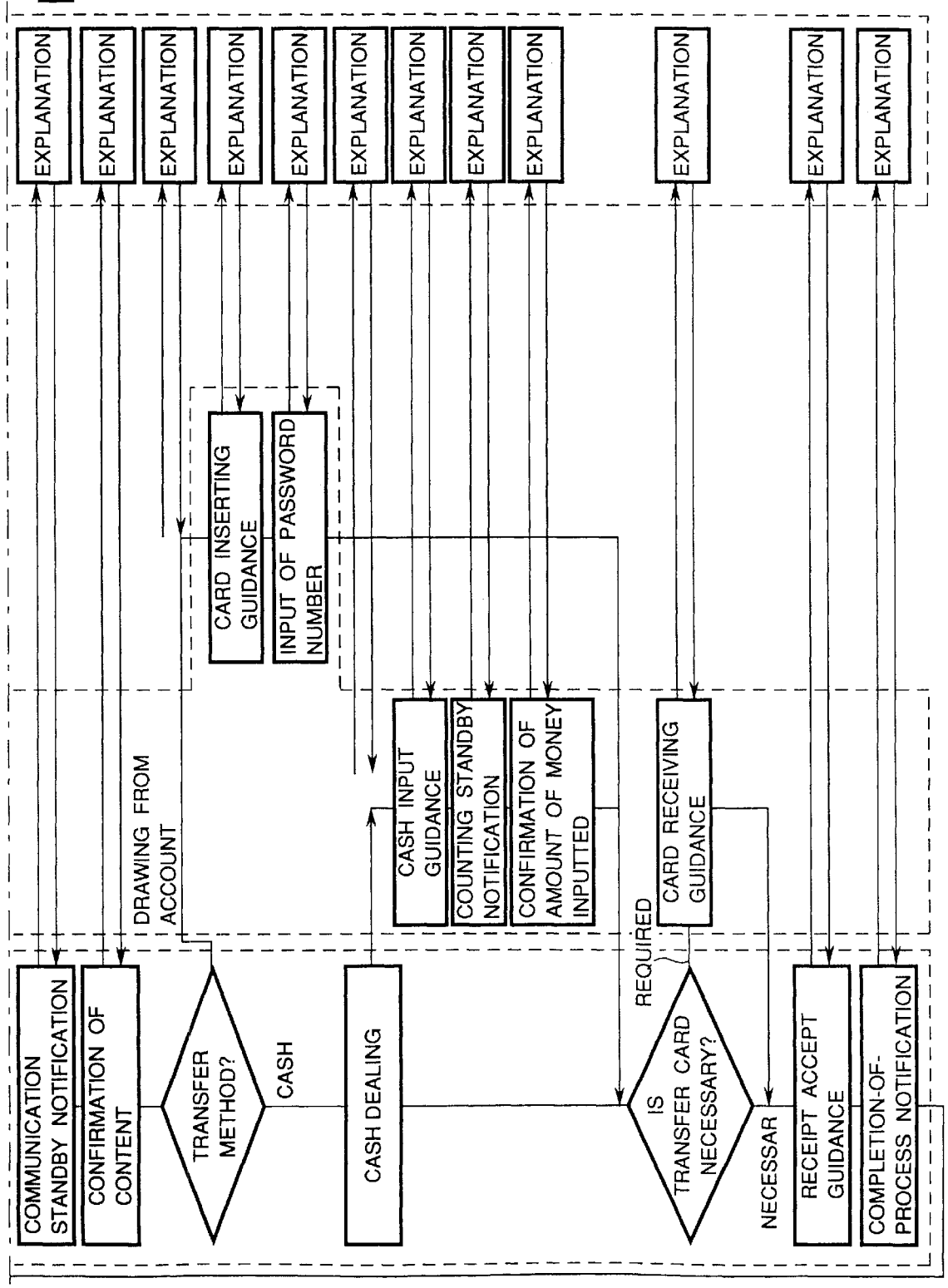

FIG.28

| CLASSIFICATION OF INPUT ITEM | CLASSIFICATION OF EXPLANATION INDICATOR | CLASSIFICATION OF INPUT PANEL INDICATOR | OUTPUT DATA |
|---|---|---|---|
| TRANSFER DESTINATION FINANCIAL INSTITUTE | | | |
| ACCOUNT NUMBER | 83a | 84a | |
| NAME OF RECIPIENT | 83 | 84c | |
| AMOUNT OF MONEY FOR TRANSFER | 83b | 84b | |

25

PROIR ART

AUTOMATIC DEALING APPARATUS

BACKGROUND OF THE INVENTION

The present invention relates to an automatic dealing apparatus referred to as an automatic teller's machine (ATM), an automatic cash dispenser (CD), an automatic cash depositing machine, a money transfer only machine, or a security issuing machine etc.

Over the recent years, there has been utilized the automatic dealing apparatus capable of dealing through no intermediary of any bank workers etc in a financial institute such as a bank etc. In this type of automatic dealing apparatus, a customer carries out an operation such as inputting data interactively while observing information displayed on a display device, thus implementing a desired dealing.

Namely, a start screen on which to display classifications of available dealings is displayed as an initial screen on the display device of the automatic dealing apparatus. Then, when the customer selects a desired dealing classification on this start screen, the processing by the automatic dealing apparatus is started. The display device includes a touch panel, and the customer pushes a key or button displayed on the display device, thereby executing an operation and inputting the data with respect to the automatic dealing apparatus.

Upon selecting an arbitrary dealing on the start screen (upon pushing an arbitrary dealing classification button displayed on the display device), the automatic dealing apparatus executes processes corresponding to the relevant dealing. That is, the automatic dealing apparatus sequentially displays, on the display device, a plurality of dealing screens showing operation contents of the automatic dealing apparatus in accordance with predetermined operation procedures so that the dealing concerned is conducted between the customer and the apparatus. In response thereto, the customer pushes the key and the button set within that screen in accordance with the display content on each dealing screen, thus proceeding the operation procedure. Then, when all the operation procedures are finished, the dealing process by the automatic dealing apparatus terminates, and the dealing selected by the customer is treated as being implemented between the customer and the financial institute.

The dealing with the financial institute are indispensable in terms of living in the day-to-day life, and, according to the data from a certain source, approximately 80% of the customers visiting the financial institutes such as banks etc conduct the dealings by utilizing the automatic dealing apparatuses. The automatic dealing apparatus utilized by a great majority of people may be said to be an apparatus exhibiting a remarkably high public nature.

Incidentally, users of the automatic dealing apparatus spread over a wide range from young generations up to elderly generations. Further, there must be, depending on the users, an infinite variety of capacities of knowledge about the operations of the automatic dealing apparatus and about dealing knowledge with the financial institutes. namely a degree of familiarization of how to operate the automatic dealing apparatus largely differs depending on the users. To cope with this difference, the automatic dealing apparatus be, it is desired, constructed to offer an equal operating environment to all the suers irrespective of the degree of familiarization of the user.

There are, however, the following problems inherent in the prior art automatic dealing apparatus. FIGS. 31 and 32 are explanatory diagrams showing a dealing screen displayed on the display device of the conventional automatic dealing apparatus and display procedures thereof, wherein dealing screens 501–506 are shown by way of example when in a "Money Transfer" dealing.

As illustrated in FIG. 31, when the user conducts the "Money Transfer" dealing, the dealing screen 501 is displayed on the display device of the automatic dealing apparatus. Then, the user is inquired whether the or she has a money transfer card on this dealing screen 501, and inputs an answer of having or not having the money transfer card to the automatic dealing apparatus.

At this time, if the suer inputs to the automatic dealing apparatus, e.g., a purport of not having the money transfer card, the dealing screen 502 shown in FIG. 32, which replaces the dealing screen 501, is displayed on the display device. Then, the user designates a transfer destination financial institute in accordance with the dealing screen 502, at which time the dealing screen 503 is displayed in place of the dealing screen 502 on the display device. Subsequently, the user inputs an account number of the transfer destination financial institute in accordance with the dealing screen 503. Thereafter, the user inputs a name of the recipient in accordance with the dealing screen 504 replacing the dealing screen 503, which is displayed on the display device.

Thereupon, the dealing screen 505 shown in FIG. 31 is displayed replacing the dealing screen 504 on the display device. Then, the user inputs an amount of money for transfer in accordance with the dealing screen 505, at which time the dealing screen 506 defined as a confirmation screen of a content of the money transfer is displayed replacing the dealing screen 505 on the display device.

As described above, in the prior art automatic dealing apparatus, only an operation content at that point of time is displayed on each of the dealing screens 501–506 displayed on the display device in the dealing process. Further, each of the dealing screens 501–506 is completely switched over to the next dealing screen every time the operation procedure advances.

Therefore, the user is unable to grasp the operation procedures already carried out, a content of the data already inputted, the content of the operation procedure which will hereinafter be conducted or a flow of the whole operation procedures from a display content on the dealing screen being displayed at present on the display device. Accordingly, the user becomes incapable of grasping the operation procedure being conducted at present by the user and a condition of how the operation procedure advances, and it might happen that the data is mis-inputted, and that the automatic dealing apparatus is mis-operated.

Further, in the conventional automatic dealing apparatus, as shown in FIG. 33, only one set of operation procedures are prepared for each dealing that can be implemented by use of the automatic dealing apparatus, and a plurality of dealing screens based on the operation procedures are merely sequentially displayed on the display device. If the data input can be omitted, however, a dealing screen for a next operation procedure is displayed skipping over a single number of or a plurality of dealing screens that should be normally displayed.

For example, when the dealing screen 501 shown in FIG. 32 is displayed, and if the user has the money transfer card recorded with a transfer destination financial institute, an account number of the transfer destination financial institute and data about a recipient, the user makes the automatic dealing apparatus read the record content of this money transfer card. Then, the dealing screen 505, which replaces the dealing screen 501, is displayed on the display device, skipping over the dealing screens 502–504. Therefore, it was impossible to recognize that the indications of the dealing screens 502–504 are omitted on the display device, and that the operation procedures are reduced. In this respect also, t might happen that the user is unable to grasp the operation procedure being conducted at present and the condition of how the operation procedure advances.

Moreover, as shown in FIG. 33, in the prior art automatic dealing apparatus, only one set of operation procedures are prepared for one dealing classification, and hence the user of the automatic dealing apparatus has to operate the automatic dealing apparatus in accordance with the same operation procedures irrespective of a degree of familiarization of the operation. Herein, the operation procedures of the automatic dealing apparatus are set aiming at the users having an average degree of familiarization f the operation in order to correspond to the suers in as a wide range as possible.

Hence, the operation procedures are offered as those simplified to the users having a low degree of familiarization but as being redundant to the users having a high degree of familiarization. Accordingly, the users having the low degree of familiarization are incapable of grasping or predicting the sequence of the operation procedures of the automatic dealing apparatus or an operation method etc, resulting in a mis-operation in some cases. On the other hand, the users having the high degree of familiarization might feel troublesome in operating the automatic dealing apparatus in accordance with the redundant operation procedures, which feeling might lead to a negligence of confirming a display content (an input item etc) on the dealing screen. This results in the mis-input of the data or the mis-operation in some cases.

SUMMARY OF THE INVENTION

It is a primary object of the present invention, which was contrived to obviate the problems given above, to provide an automatic dealing apparatus capable of enhancing an operability regardless of a degree of familiarization of an operation of a user.

The present invention adopts the following constructions in order to accomplish the above object.

According to a first aspect of the present invention, an automatic dealing apparatus comprises a display device for displaying information about a dealing, an input device for inputting data about the dealing, and a control unit for controlling an information display on the display device, and executing a dealing process based on the input data inputted from the input device in accordance with the information displayed on the display device. The control unit causes the display device to display an operation procedure indicator structured by arranging, in a sequence of data inputs, a plurality of input item columns in which to show respective items of input data inputted from the input device, and to display an operation screen corresponding to each of the input data in such a state as to be superposed on the operation procedure indicator when the input data are inputted from the input device.

According to the first aspect of the present invention, the control unit makes the display device display the operation procedure indicator. Then, when the input data are inputted from the input device, the control unit has the operation screen corresponding to the input data displayed in the state of being superposed on the operation procedure indicator. Accordingly, the user of the automatic dealing apparatus is able to grasp the information such as a plurality of input items, the number of the input items and an input sequence etc from the operation procedure indicator. Based on this, the automatic dealing apparatus can be operated by use of the operation screen displayed in superposition on the operation procedure indicator.

Herein, as the automatic dealing apparatus, there may be exemplified, e.g., an ATM, a CD, a cash depositing machine, a money transfer only machine or a security issuing machine.

According to a second aspect of the present invention, the operation procedure indicator in the first aspect thereof is so structured as to be displayed substantially over an entire period of the dealing process. According to the second aspect of the invention, the user is capable of grasping the operation of the automatic dealing apparatus more properly than ever before by observing the operation procedure indicator during the dealing.

According to a third aspect of the present invention, the control unit in the first aspect of the invention changes a speed of changing a display content on the display device in accordance with a request given from a user. According to the third aspect of the invention, the user is able to operate the automatic dealing apparatus in accordance with a degree of familiarization of the operation thereof.

According to a fourth aspect of the present invention, the control unit in the first aspect of the invention causes the display device to display operation information on the data input when the data are inputted from the input device, and changes the number of times with which the operation information is displayed in accordance with a request from the user. According to the fourth aspect of the invention, the user is able to operate the automatic dealing apparatus in accordance with the degree of familiarization of the operation thereof.

According to a fifth aspect of the present invention, a part of the operation screen is so structured as to be displayed semi-transparently. According to the fifth aspect of the invention, the user can observe the contents of the operation procedure indicator, seeing through the operation screen, and is therefore able to adequately operate the automatic dealing apparatus.

According to a sixth aspect of the present invention, a specified area is set on the screen of the display device in the second aspect of the invention, and the control unit is so constructed as to cause the display device to display in the specified area the input item column corresponding to the operation procedure that is being conducted at present among the plurality of input item columns by moving the operation procedure indicator displayed on the display device in a direction substantially orthogonal to a longitudinal direction of each input item column in accordance with an advancement of the operation procedure of a dealing. According to the sixth aspect of the invention, the user is able to grasp the operation that should be conducted by the user himself or herself by continuing to see the specified area.

According to a seventh aspect of the present invention, an input data display area for displaying the input data inputted from the input device is set in each input item column in the second or sixth aspect of the invention, and the control unit is so constructed as to retain the input data, make the display content on the display device revert to a state when inputting the input data in accordance with a request from the user, and have the input data displayed in the input data display area of the relevant input item column. According to the seventh aspect of the invention, the operation procedure of the automatic dealing apparatus can be returned to the procedure already finished in response to a request of the suer.

According to an eighth aspect of the present invention, the control unit in the seventh aspect of the invention is so constructed as to exclude an operation screen existing in a range of being overlapped with at least the operation procedure indicator from the display content on the display device in accordance with a request from the user, and cause the display device to display the input data retained by the control unit itself in the input data display area of the relevant input item column. According to the eighth aspect of the invention, a part of the operation screen is excluded from the display content, whereby the user can see the input data displayed in the input data display area of each input item column more adequately.

According to a ninth aspect of the present invention, the control unit in the seventh aspect of the invention is so constructed as to cause the display device to display in enlargement the input data display area of the input item column displayed in the specified area, and also the input data displayed in this input data display area. According to the ninth aspect of the invention, the input data inputted in the operation procedure being conducted at present is displayed in enlargement, so that the user comes to have an advantage of making it easier to defect an error in the input data.

According to a tenth aspect of the present invention, a button for modifying the input data displayed in the input data display area, is provided in each input item column in the seventh aspect of the invention. According to the tenth aspect of the invention, the modifying button is provided in every input item column, and hence the user is able to comprehend a meaning of the modifying button without any misunderstanding.

According to an eleventh aspect of the present invention, the control unit in the seventh aspect of the invention is so constructed as to cause, when all the data about the dealing process are inputted, the display device to display the operation procedure indicator as a confirmation screen of each piece of input data, and to display each piece of input data in the input data display area of the relevant input item column.

According to a twelfth aspect of the present invention, the operation screen is so structured as to be displayed on a lower side of the specified area in the sixth aspect of the invention, an explanation indicator showing an explanation of the operation screen is displayed on an upper side of the specified area, and a dealing classification display column for showing a dealing classification is displayed on an upper side of the explanation indicator.

According to a thirteenth aspect of the present invention, the automatic dealing apparatus in the twelfth aspect of the invention further comprises a screen creation table stored with specified pieces of data of the operation screen and the explanation indicator corresponding to each input item column. The control unit is so constructed as to obtain image data of the operation procedure indicator corresponding to the dealing classification, specify any one of the plurality of input item column constituting the operation procedure indicator, obtain respectively the image data of the explanation indicator corresponding to the specified input item column and the image data of the operation screen in accordance with specified data stored in the screen creation table, and generate screen data to be displayed on the display device by use of the obtained image data of the operation procedure indicator, the image data of the explanation indicator, and the image data of the operation screen. According to the thirteenth aspect of the invention, the screen data displayed on the display device is created based on the storage content in the screen creation table, and therefore, when changing the display content on the display device, the contents in the screen creation table may simply be varied without any necessity for changing the screen data creation program executed by the control unit.

According to a fourteenth aspect of the present invention, a canceling button for forcibly terminating the dealing process is provided in the dealing classification display column in the twelfth aspect of the invention. According to the fourteenth aspect of the invention, the canceling button is provided in the vicinity of the dealing classification displayed in the dealing classification display column, thereby making it feasible to prevent the canceling button from being mistakenly pushed because of the user being able to recognize a meaning of the canceling button.

According to a fifteenth aspect of the present invention, the control unit in the sixth aspect of the invention is so constructed as to cause, if the number of the input item columns constituting the operation procedure indicator is less than a predetermined value, the display device to fixedly display the operation procedure indicator substantially over an entire period of the dealing process.

According to a sixteenth aspect of the present invention, the plurality of input item columns in the sixth aspect of the invention are so structured as to be sectioned into a plurality of operation sets in accordance with attributes of the input data inputted from the input device, and displayed in different colors per operation set. According to the sixteenth aspect of the invention, the user is able to distinguish the operation set from the plurality of input item columns and more properly grasp a condition of how the operation procedure advances from the colors of the operation sets.

According to a seventeenth aspect of the present invention, the plurality of input item columns constituting the respective operation sets in the sixteenth aspect of the invention are so structured as to be segmented by colors in such a state as to represent gradations along the data input sequence. According to the seventeenth aspect of the invention, the user can grasp more properly the condition of how the operation procedure advances from the colors of the input item columns forming the operation set.

According to an eighteenth aspect of the present invention, a basic color of the screen on the display device in the sixteenth or seventeenth aspect of the invention is so structured as to change corresponding to a color of the input item column displayed in the specified area. According to the eighteenth aspect of the invention, the present operation procedure can be easily understood from the basic color of the screen and the color of the input item column.

According to a nineteenth aspect of the present invention, the automatic dealing apparatus in the sixth aspect of the invention further comprises a voice output unit for outputting a voice when the control unit moves the operation procedure indicator in the direction substantially orthogonal to the longitudinal direction of each input item column. According to the nineteenth aspect of the invention, the voice output unit outputs the voice when the operation procedure indicator shifts, and therefore the user can easily comprehend that the operation procedure has advanced.

According to twentieth aspect of the present invention, the control unit in the first aspect of the invention is so constructed as to detect an input time defined as a time required for the user to input the specified data, and, if this input time is under a predetermined value, increase a changing speed of the display content on the display device. According to the twentieth aspect of the invention, if the user has a high degree of familiarization of operating the automatic dealing apparatus, the user can reduce a dealing time.

According to a twenty first aspect of the present invention, the control unit in the twentieth aspect of the invention is so constructed as to cause the display device to display the operation information on the data input when the data are inputted from the input device, and decrease the number of indications of the operation information if the input time is under the predetermined value. According to the twenty first aspect of the invention, if the user has the high degree of familiarization, the user can further reduce the dealing time by decreasing the number of indications of the operation information, and can smoothly operate the automatic dealing apparatus.

According to twenty second aspect of the present invention, an automatic dealing apparatus comprises a display device for displaying information about a dealing, an input device for inputting data about the dealing, and a control unit for controlling an information display on the display device, and implementing a dealing process based on the input data inputted from the input device in accordance with the information displayed on the display device. A specified area is provided on the screen on the display device, and the control unit causes the display device to display an operation procedure indicator structured by arranging, in a sequence of data inputs, a plurality of input item columns in which to show respective items of input data inputted from the input device, and to display in the specified area the input item column corresponding to the operation procedure that is being conducted at present among the plurality of input item columns by moving the operation procedure indicator in a direction substantially orthogonal to a longitudinal direction of each input item column in accordance with an advancement of the operation procedure of a dealing.

According to a twenty third aspect of the present invention, an automatic dealing apparatus comprises a display device for displaying information on a dealing, an input device for inputting data about the dealing, and a control unit for controlling an information display on the display device, and implementing a dealing process based on the input data inputted from the input device in accordance with the information displayed on the display device. The control unit provides one procedure composed of a plurality of operations and any one of the plurality of procedures corresponding respectively to a plurality of operations contained in one procedure in response to a request given from a user.

According to a twenty fourth aspect of the present invention, the control unit in the first or twenty third aspect of the invention is so constructed as to cause the display device to display a caution indicator for prompting to input data if there is no data input from the input device for a predetermined time. According to the twenty fourth aspect of the invention, it is possible to prompt the user to input the data without getting the user irritated as compared with the method of suddenly outputting the alarm sound if there is no data input for the predetermined time.

According to a twenty fifth aspect of the present invention, the control unit in the first or twenty third aspect of the invention is so constructed as to cause the display device to display an input operation guidance of the data if there is no data input from the input device for a predetermined time. According to the twenty fifth aspect of the invention, the input operation guidance is displayed, thereby making it feasible to show to the user himself or herself which data to input and enabling the user to smoothly advance the operation procedure.

According to a twenty sixth aspect of the present invention, in the first or twenty third aspect of the invention, the screen displayed on the display device when the data are inputted from the input device, is so structured as to be generated by a synthetic process of plural sets of image data by the control unit, and an image corresponding to each set of image data is displayed in a predetermined area set on the screen on the display device.

According to a twenty seventh aspect of the present invention, the automatic dealing apparatus in the first or twenty third aspect of the invention further comprises a voice output unit for outputting a voice when the control unit is brought into such a state as to be capable of receiving the input data from the input device.

According to a twenty eighth aspect of the present invention, in the first or twenty third aspect of the invention, the input device is a touch panel, and the automatic dealing apparatus further comprises a voice output unit for outputting a voice. The control unit is so constructed as to detect positional information of an object coming into contact with the touch panel, and, when judging that the object changes its own position in the contact state with the touch panel on the basis of the detected positional information, cause the voice output unit to output an alarm sound. According to the twenty eighth aspect of the invention, if the user, for instance, slides the finger thereon, the alarm sound is outputted, and hence the data mis-input due to the finger slide of the user can be prevented.

BRIEF DESCRIPTION OF THE DRAWINGS

Other objects and advantages of the present invention will become apparent during the following discussion in conjunction with the accompanying drawings, in which:

FIG. 7 is an explanatory diagram showing a procedure display;

FIG. 8 is an explanatory diagram showing the procedure display;

FIG. 13 is an explanatory diagram showing the input panel indicator;

FIG. 14 is an explanatory diagram showing a confirmation screen;

FIGS. 15(a) and 15(b) are explanatory diagram showing a return button;

FIG. 28 is an explanatory diagram showing a screen creation table;

DETAILED DESCRIPTION OF THE PREFERRED EMBODIMENTS

Preferred embodiments of the present invention will hereinafter be described with reference to the accompanying drawings.

Embodiment 1

To start with, an embodiment of the present invention will be described.

[Construction of Automatic Dealing Apparatus]

Figure 1:
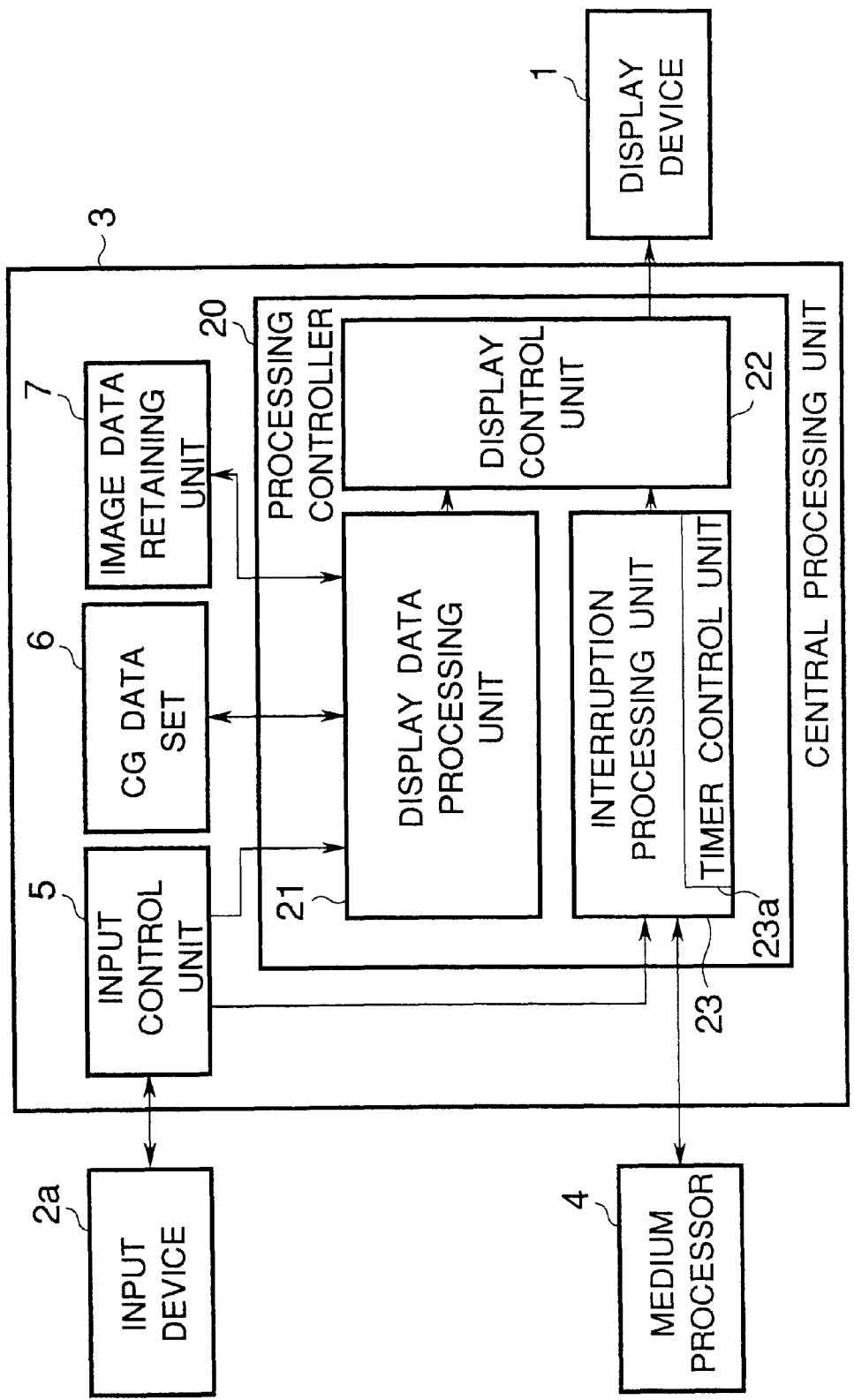
FIG. 1 is a block diagram showing a principal portion of an ATM.

FIG. 1 is a block diagram illustrating a principal construction of an automatic teller's machine (hereinafter abbreviated to "ATM" which corresponds to the automatic dealing apparatus) in accordance with the embodiment 1. Referring to FIG. 1, the ATM includes a display device 1, an input device 2a, a central processing unit 3 and a medium processor 4.

The display device 1 is constructed by use of, e.g., a CRT display unit or a liquid crystal display panel, and displays operation information etc of the ATM. The input device 2a is defined as a transparent plate-like switch (a touch panel) superposed on a display screen of the display device 1. The input device 2a detects a position in which a user touches on the touch panel, and inputs information corresponding to this position to the central processing unit 3. The medium processor 4 deals with mediums including a magnetic card, a banknote, a slip and cash etc.

The central processing unit 3 includes an input control unit 5, a CG (Character Generator) data set 6, an image data retaining unit 7 and a processing controller 20. Herein, the input control unit 5 controls the input device 2a. The CG data set 6 has a character generator consisting of a data set for storing, e.g., character patterns (character codes, and font data) required for displaying, and generates character data structuring display information such as a message etc displayed on the display device 1. The image data retaining unit 7 is previously stored with plural pieces of image data which shape a display screen to be displayed on the display device 1. Each of the plural pieces of image data is read from the image data retaining unit 7 as the necessity may arise, and supplied for displaying. Further, each piece of image data is synthesized with the character pattern generated by the CG data set 6 according to the necessity, and supplied for displaying. Note that the image data stored in the image data retaining unit 7 may be, e.g., platting data of the ATM or image data obtained by imaging the real ATM by an imaging device such as a video camera etc and extracting only a necessary part of the image.

The processing controller 20 includes a display data processing unit 21, a display control unit and an interruption control unit 23. The processing controller 20 controls an information display on the display device 1, and executes a dealing process based on the information inputted from the input device 2a via the input control unit 5. This processing controller 20 is a device for implementing the processing control of the central processing unit 3, and is constructed of, e.g., a microprocessor unit (MPU, ROM, RAM etc) for executing a program.

The display data processing unit 21 generates display data to be displayed on the display device 1 on the basis of the information such as input information, the display character data, the image data and the interruptions etc, which are obtained from the input control unit 5, the CG data set 6, the image data retaining unit 7 and the interruption processing unit 23, and supplies the display control unit 22 with the generated display data.

The display control unit 22 controls the display device 1 on the basis of the display data received from the display data processing unit 21, and indicates the display device 1 to display a screen corresponding to the display data. The interruption processing unit 23 includes a timer control unit 23a for a timer interruption, and executes interrupt control with respect to the display data processing unit 21 in accordance with the information given from the medium processor 4 as well as from the input control unit 5.

Figure 2:
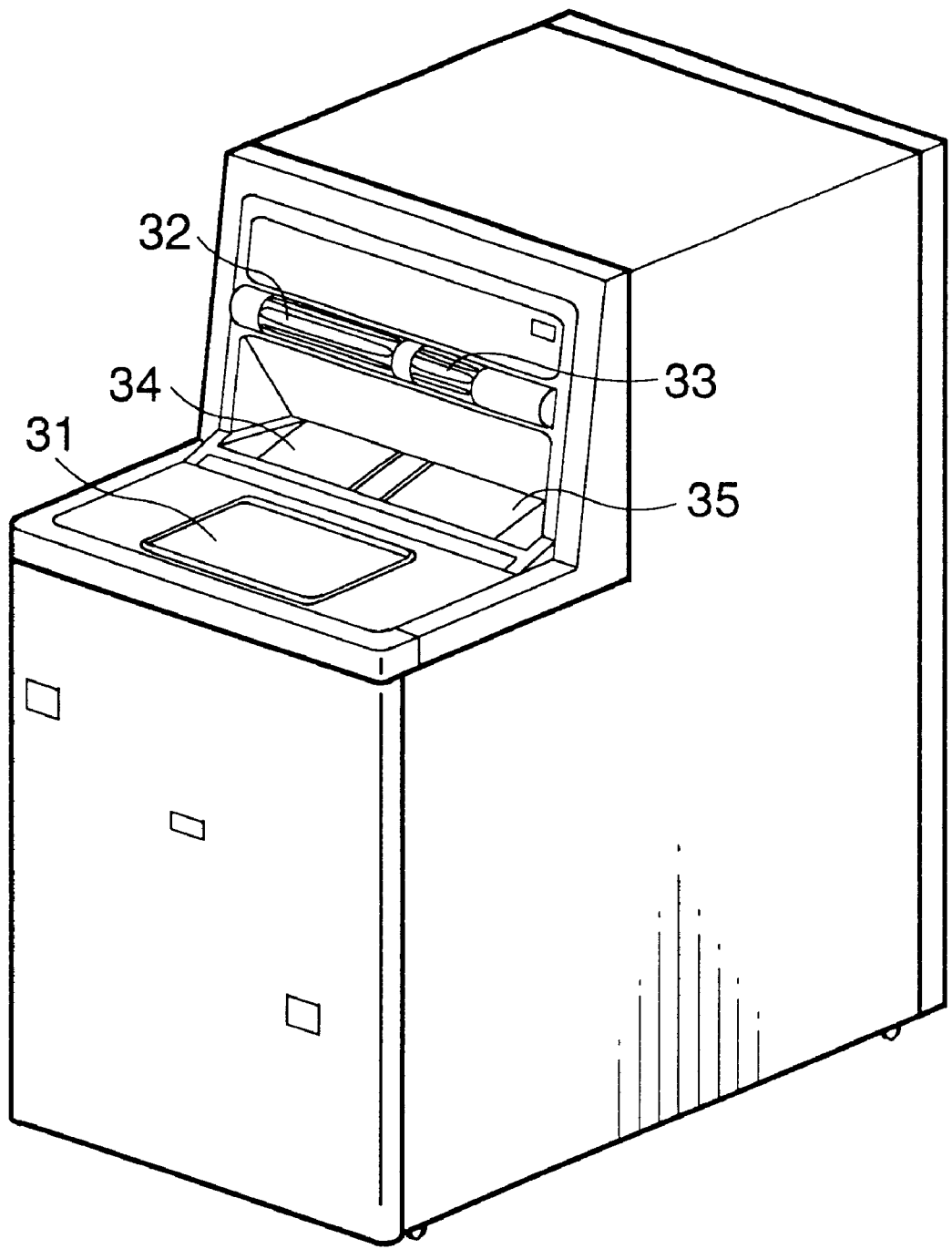
FIG. 2 is a view showing an external configuration of the ATM.
Figure 3:
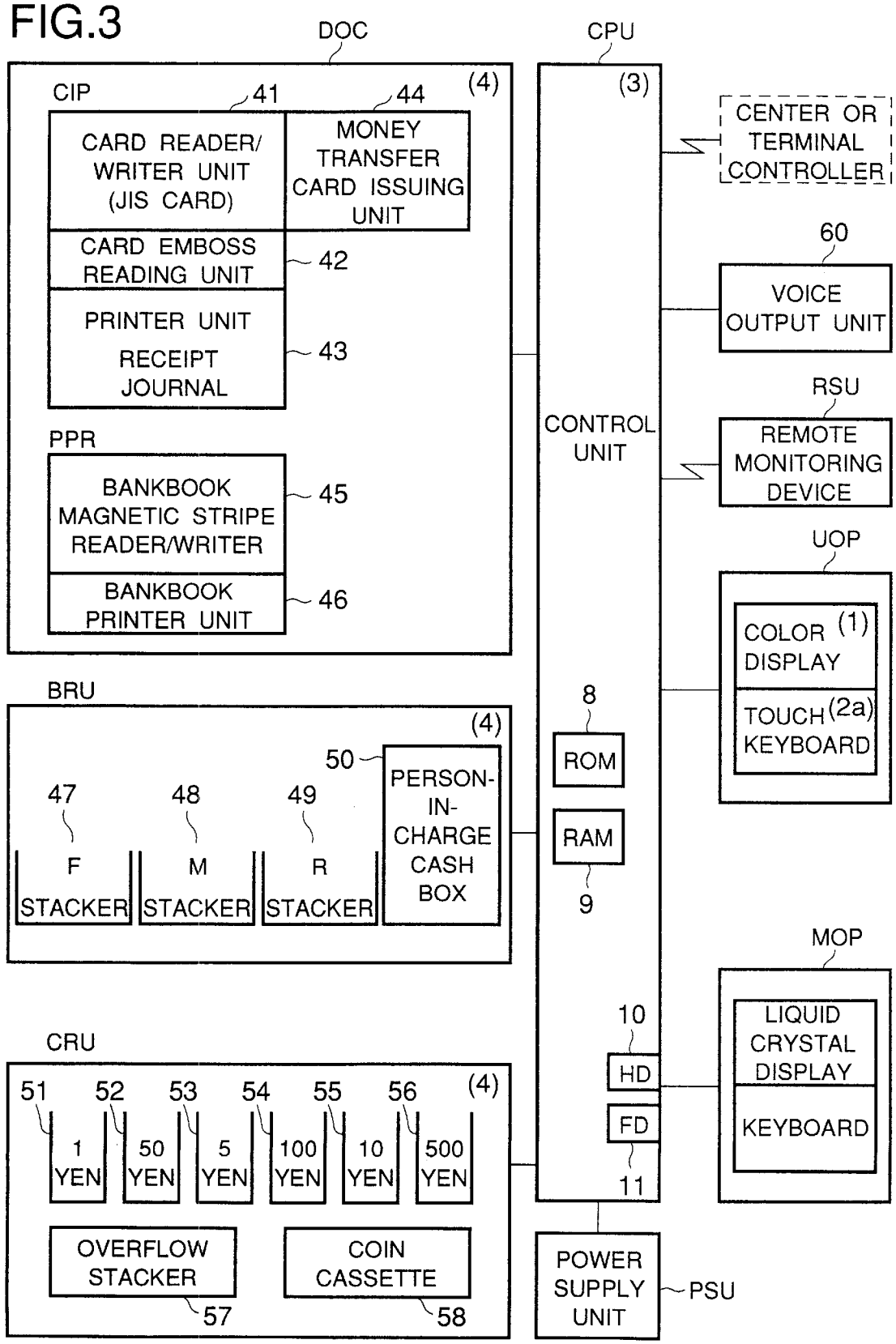
FIG. 3 is a block diagram showing a specific construction of the ATM.

FIG. 2 is a view illustrating an external configuration of the ATM incorporating the construction shown in FIG. 3. FIG. 2 shows an ATM box body, the display module 31 consisting of the display device 1 and the input device 2a shown in FIG. 1, a bankbook inlet/outlet 32 through which a bankbook is inserted and taken out, a card inlet/outlet 33 through which a car and a slip are inserted and taken out, a coin inlet/outlet port 34 through which coins are thrown in and taken out, and a paper money inlet/outlet 35 through which the paper money is inserted and taken out.

FIG. 3 is a block diagram showing a specific internal structure of the ATM. Referring to FIG. 3, the ATM incorporates a deed outputting and card reading/writing unit DOC, a paper money recycling unit BRU, a coin recycling unit CRU, a customer operation unit UOP, a management operation unit MOP, a control unit CPU, and a power supply unit PSU.

The control unit CPU corresponds to the central processing unit 3 shown in FIG. 1. The control unit CPU is connected to a center computer (a host computer) via a transmission line such as a communication line etc. Alternatively, the control unit CPU is connected to a terminal controller (to which a plurality of terminal devices such as ATMs are connected) from the transmission line such as the communication line etc, and linked via this terminal controller to the center computer. The ATM communicates with the center computer and thus proceeds a dealing while updating a ledger of the center computer, i.e., a file stored with balances of individuals and dealing histories etc.

Connected further via the transmission line such as the communication line etc to the control unit CPU is a remote monitoring device RSU for monitoring, from a remote area, a state of the ATM installed particularly in a branch office and a unmanned shop (where only the ATM system is installed without any workers). The remote monitoring device RSU monitors the plurality of ATMs, and functions to prevent and detect faults thereof and take measures against these faults or implement maintenance thereof.

The deed outputting and card reading/writing unit DOC, the paper money recycling unit BRU and the coin recycling unit CRU, correspond to the medium processor 4 shown in FIG. 1. The deed outputting and card reading/writing unit DOC is constructed of a card reading/writing and image reading/printer unit CIP and a bankbook printer unit PPR. The card reading/writing and image reading/printer unit CIP is constructed of a card reader/writer unit 41, a card emboss reading unit 42, a printer unit 43 and a transfer card issuing unit 44.

The card reader/writer unit 41 reads information on a bank account number and a branch office number etc on magnetic stripes of the card inserted into the card inlet/outlet 33 in order to implement a dealing, and writes on the magnetic stripes according to the necessity. The card emboss reading unit 42 reads imagewise a name and the bank account number on a card embossed part of the card inserted into the cart inlet/outlet 33. The printer unit 43 prints on a receipt (a detailed statement) the bank account number read from the card and an amount of dealing etc, and outputs the receipt from the card inlet/outlet 33. The printer unit 43 then stores the data identical with the data printed on the receipt as the printing information, i.e., a journal in the apparatus. The transfer card issuing unit 44 issues a transfer card by writing transfer information about a transfer destination etc on the magnetic stripes on the underside of the transfer card used for a transfer dealing and printing required information in a blank area on the surface thereof. This transfer card is also outputted from the card inlet/outlet 33.

The bankbook printer PPR has a bankbook magnetic stripe reader/writer unit 45 and a bankbook printer unit 46. The bankbook magnetic stripe reader/writer unit 45 executes, for example, reading/writing processes from and to the magnetic stripes of the bankbook inserted into the bankbook inlet/outlet 32. The bankbook printer unit 46 prints the dealing history on the bankbook. The paper money recycling unit BRU has, e.g., three pieces of stackers 47, 48, 49, and a person-in-charge cash box 50, and deals with the paper money.

Among the three stackers 47–49, one stacker 47 stores sheets of paper money of, e.g., 1,000 yen, and the two stackers 48, 49 store sheets of paper money of 10,000 yen. In the case of a dealing of paying the money, a designated amount of money is paid out to the paper money inlet/outlet 35 from the stackers 47–49. In the case of a dealing of receiving the money, sheets of the paper money inserted into the paper money inlet/outlet 35 are stacked up in the stackers 47–49 according to money classifications. Note that sheets of paper money of 5,000 yen are stacked up in a stacker (unillustrated) for an exclusive use of collection thereof. Further, the paper money is transferred and received between the three stackers 47–49 and the attachable/detachable person-in-charge cash box 50 as the necessity arises. That is, if the amount of paper money stacked up in any one of the three stackers 47–49 is reduced as the money payment dealings are consecutively conducted, the person-in-charge cash box 50 replenishes the stacker the paper money quantity of which is reduced, with the paper money, whereby the money receipt dealings are consecutively conducted. While on the other hand, if any one of the stackers 47–49 is full of the paper money, the paper money is collected from the stacker full of the paper money and carried to the cash box 50.

The coin recycling unit CRU is constructed of stackers 51, 52, 53, 54, 55, 55, 56 provided corresponding to coin classifications, an overflow stacker 57 and a coin cassette 58. The coin recycling unit CRU deals with the coins. If needed to pay the coins in a dealing requiring a change as in the case of the money payment dealing and the transfer dealing, a required amount of coins are paid from the respective stackers 51–56 through the coin inlet/outlet 34. Further, when coins are put into the coin inlet/outlet 34, the coins put thereinto are stored in the stackers 51–56 according to the coin classifications. Moreover, if the payment of the coins continues to such an extent that the respective stackers 51–56 become deficient in the coins, the stackers 51–56 are replenished with the coins from the coin cassette 58. Furthermore, the coins are consecutively stored, whereby the coins overflowed from the stackers 51–56 are stored in the overflow stacker 57. Note that the overflow stacker 57 and the coin cassette 58, which are of an attachable and detachable structure, are used for replenishing and taking out the coins.

The customer operation unit UOP includes a color display device 59 serving as the display device 1, and a touch keyboard 60 constructed of a touch panel serving as the input device 2a that is superposed on the display screen of the display device 59. Namely, the display screen of the color display device 59 and the touch keyboard 60 constitute the display input unit 31 shown in FIG. 2.

The management operation unit MOP, which has a liquid crystal display 61 and a keyboard 62, grasps an internal state of the ATM as in the case of the remote monitoring device RSU, and enables necessary maintenance operations to be done.

A voice output unit 60 is constructed of a voice processor, an amplifier circuit and a loud speaker etc. This voice output unit 60 outputs a voice to the outside in accordance with a command given from the control unit CPU.

[Process by ATM]

Next, processes by the control unit CPU with respect to the customer operation unit UOP will be explained by way of the above-described processes by the ATM. Referring to FIG. 1, the processing controller 20 of the central processing unit 3 (the control unit CPU), upon switching ON the power supply unit PSU shown in FIG. 3, loads into the RAM 9 a control program recorded on the ROM 8 possessed by the controller 20 itself or a hard disk (HD) 10 or a floppy disk (FD) 11. The processing controller 20 executes loaded into the RAM 9, and indicates the display device 1 to start a screen display process.

Figure 4:
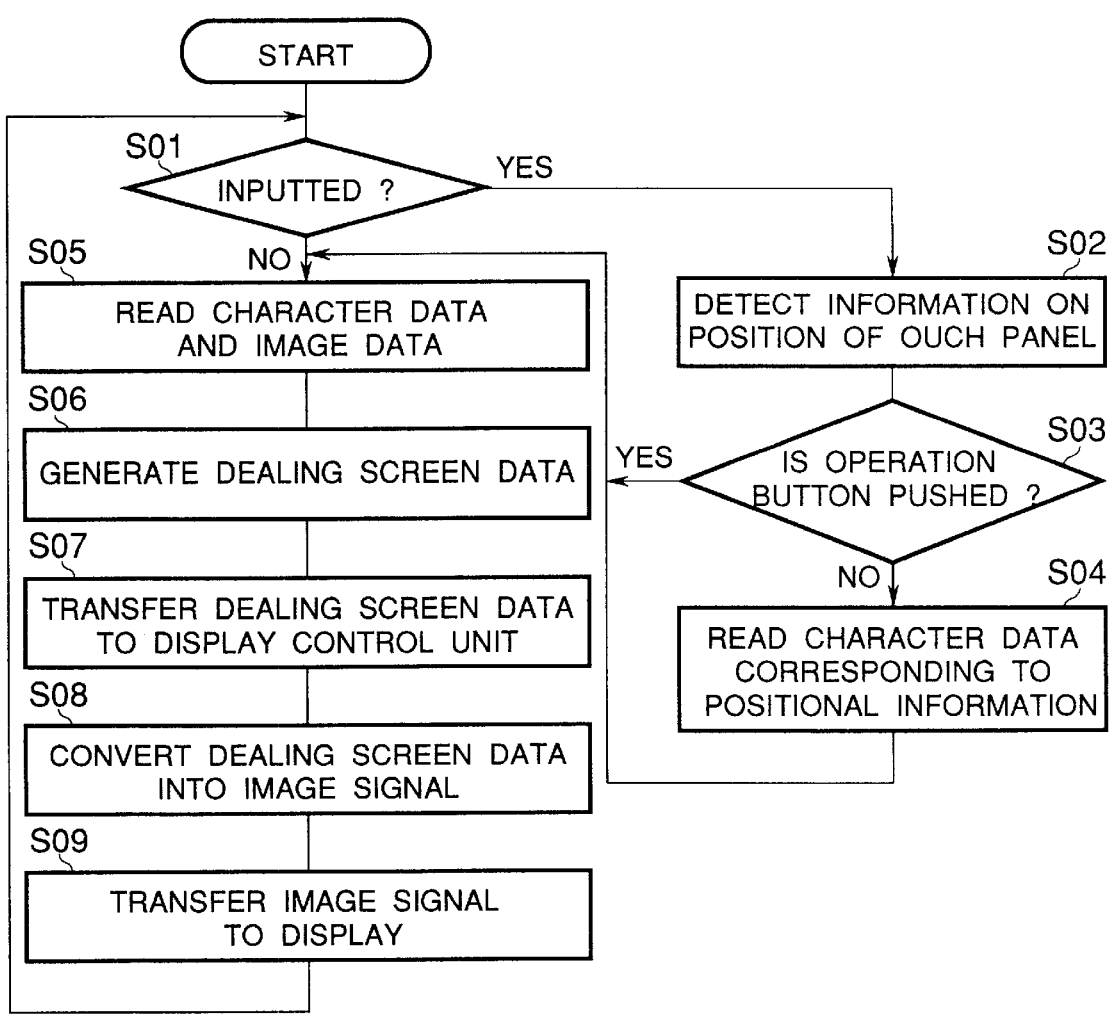
FIG. 4 is a flowchart showing processes by a control unit.

FIG. 4 is a flowchart showing the screen display process of the display device 1. Referring to FIG. 4, upon the start of the screen display process, the display data processing unit 21 shown in FIG. 1 judges whether or not positional information is transferred via the input control unit 5 from the touch panel defined as the input device 2a (step S01). At this time, the display data processing unit 21, when judging that the positional information is not yet transferred (S01; NO), proceeds the processing to step S05. By contrast, the display data processing unit 21, when judging that the positional information is transferred, proceeds the processing to step S02.

The display data processing unit 21, when proceeding the processing to step S02, obtains the positional information transferred in step S01 (step S02). Subsequently, the display data processing unit 21 judges based on the obtained positional information whether or not a user depresses an ATM operation button of "Canceling" or "Modifying" etc displayed on the display device 1 (step S03). At this time, the display data processing unit 21, when judging that the operation button is pushed (step S03; YES), proceeds the processing to step S05. Whereas when judging that the operation button is not pushed (step S03; NO), the display data processing unit 21 proceeds the processing to step S04 on the assumption that the data input key is depressed.

The display data processing unit 21, when proceeding the processing to step S04, reads from the CG data set 6 the character data (corresponding to the depressed key (button)) corresponding to the positional information obtained in step S02, and proceeds the processing to step S05.

The display data processing unit 21, in the case of proceeding the processing to step S05, reads the character data from the CG data set 6 in accordance with the control program as well as reading image data (texture data) from the image data retaining unit 7. Subsequently, the display data processing unit 21 generates picture data into which the character data is synthesized with the image data on its own VRAM (Video RAM) unillustrated therein (step S06). Subsequently, the display data processing unit 21 transfers a content of the storage in the unillustrated VRAM (step S07).

Thereupon, the display control unit 22 converts the content of the storage in the unillustrated VRAM into image signals (NTSC signal, video signal or A/Y signal) (step S08), and transfers these signals to the display device 1 (step S09). A dealing screen 70 (see FIG. 5) of the ATM is thereby displayed on the display device 1, and the information inputted from the input device 2a is displayed on the dealing screen 70. Note that the processing returns to step S01 upon an end of the process in step S09.

[Display Content on Display Device]

Next, a display content on the display device 1 will be explained.

<Dealing Screen>

Figure 5:
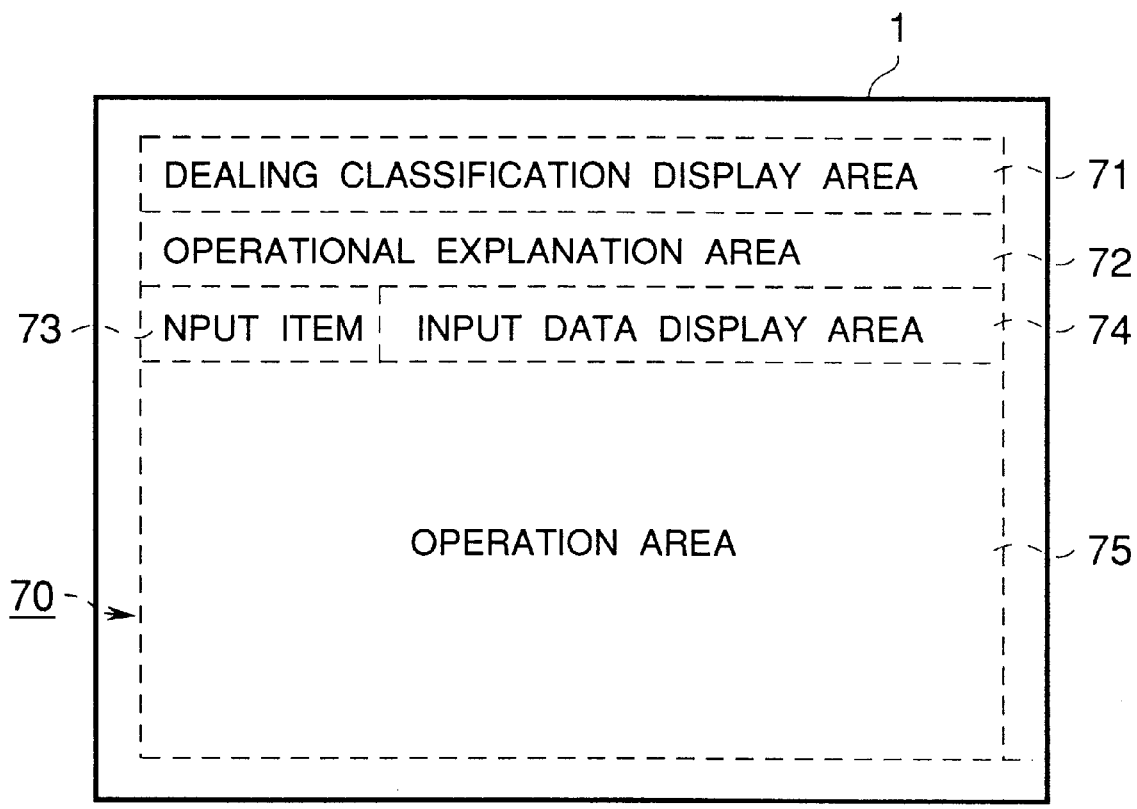
FIG. 5 is an explanatory diagram showing a dealing screen.

FIG. 5 is an explanatory diagram showing the dealing screen 70 displayed on the display device 1. The user of the ATM conducts a dealing by operating the ATM in accordance with a display content on the dealing screen 70 displayed on the display device 1. Plural kinds of dealing screens 70 are displayed on the display device 1 according to the operation procedures preset in the ATM. At this time, the dealing screen 70 is structured in a way which follows so that the user is able to properly grasp the display content on the dealing screen 70 even when the existing dealing screen 70 is replaced with other dealing screen 70.

Referring again to FIG. 5, the dealing screen 70 is defined by a rectangular shape, and comprises a dealing classification display area 71, an operation explanatory area 72, an input item display area 73, an input data display area 74 and an operation area 75.

The dealing classification display area 71 is a strip region extending on the uppermost part of the dealing screen 70, in which region a dealing classification (e.g., "Transfer" "Payment" and "Deposit" etc) is indicated. Further, the operation explanatory area 72 is a strip region extending below the dealing classification display area 71, in which region a character string representing an operational explanation of the ATM is indicated to the user.

The input item display area 73 and the input data display area 74 are strip regions each extending under the dealing classification display area 71. The input item display area 73 is disposed on the left side in the dealing screen 70, while the input data display area 74 is disposed on the right side in the dealing screen 70. A character string representing input items (e.g., "Name of Client", "Amount of Deposit" and "Account Number" etc), is displayed in the input item display area 73. Displayed in the input data display area 74 is a character string showing the data inputted by the ATM user through the input device 2a.

The operation area 75 is a rectangular region provided on the lowermost side in the dealing screen 70. Keys for the user to input the data to the ATM and ATM operation buttons, are displayed in this operation area 75.

Positions of the respective areas 72–75 described above are fixed irrespective of changes in terms of the display contents on the display device 1. Therefore, the ATM user becomes capable of grasping and predicting which information is displayed, and which position the information is displayed in during a process of advancing the ATM operation. Accordingly, even in such a case that the existing dealing screen 70 is switched to other dealing screen 70, the user is able to properly grasp the content displayed on the dealing screen and therefore able to conduct the dealing by smoothly operating the ATM.

<Screen Elements on Dealing Screen>

Figure 6:
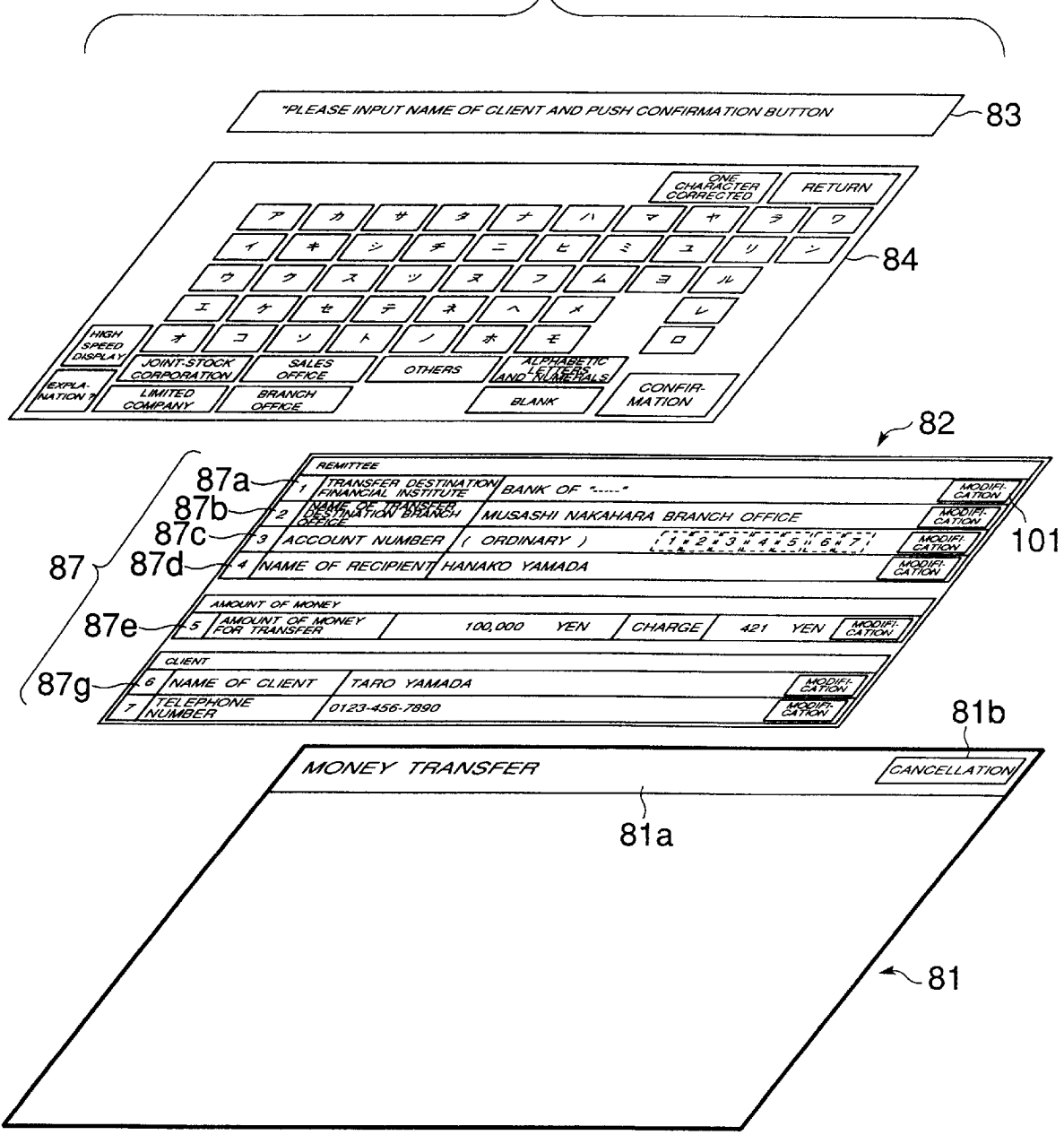
FIG. 6 is an explanatory diagram showing screen elements of the dealing screen.

FIG. 6 is an explanatory diagram showing the screen elements constituting the dealing screen 70. FIG. 6 shows the screen elements of the dealing screen 70 in a case where the dealing is classified as "Transfer". As shown in FIG. 6, the dealing screen consists of the screen elements such as a background 81, an operation procedure indicator (hereinafter referred to as a "procedure indicator") 82, an input panel indicator 84 and an explanation indicator 83. The dealing screen 70 is formed by superposing these screen elements in ATM operation procedures.

These screen elements are stored as texture data within the image data retaining unit 7 illustrated in FIG. 1. Further, the image data retaining unit 7 retains pieces of color pallet data corresponding to these pieces of texture data. Then, the above-describe screen display process (see FIG. 4) of the data concerning the screen elements, are executed, whereby the dealing screen 70 is displayed on the display device 1. Hereinafter, the respective screen elements are explained.

<Background>

As illustrated in FIG. 6, the background 81 is defined by a rectangular shape and disposed extending over the whole dealing screen 70. A strip-like dealing classification display column 81a is provided in an upper part of the background 81. This dealing classification display column 81a is disposed in the dealing classification display area 71 shown in FIG. 5, wherein the character string representing the dealing classifications is displayed (a character string of "Transfer" is displayed by way of an example in FIG. 6).

<Procedure Display>

The procedure indicator 82 is exhibited in superposition on the background 81. This procedure indicator 82 disposed extending over the operation explanatory area 72, the input item display area 73, the input data display area 74 and the operation area 75 that are shown in FIG. 5. The operation procedures effected by the ATM user on the occasion of the dealing are indicated in the procedure indicator 82.

To explain more specifically, the procedure display 72 consists of a plurality of input data columns 87 (input data columns 87a–87g are shown by way of an example in FIG. 6: which correspond to input item columns). Each input data column is a strip column extending in bilateral directions on the dealing screen 70, in which column the data inputted to the ATM according to the ATM operation procedures are displayed. The respective input data columns 87 are arranged downward from above on the dealing screen 70 in sequence of pieces of data inputted to the ATM according to the operation procedures.

Numerals indicating procedure numbers defined as sequential number of the operation procedures are displayed on the leftmost side in the respective input data columns 87, and names of the input items (names of operation items) are shown on the right side thereof. Then, the character string showing the data inputted via the input device 2a is displayed on the right side of the name of input item.

FIG. 7 is a diagram (an explanatory diagram of the procedure indicator 82 shown in FIG. 6) showing an example of the screen display on the dealing screen 70 structured such that the procedure indicator 82 is superposed on the background 81. In the example shown in FIG. 7, numerals indicating the procedure numbers are shown on the leftmost side in the respective input data columns 87a–87g, and the names of items of "Transfer Destination Financial Institute", "Name of Transfer Destination Branch Office", "Account Number", "Name of Remittee", "Amount of Transfer Money", "Name of Client" and "Telephone Number", are respectively displayed as input item names on the right side thereof. Then, empty columns in which the input data corresponding to the input item names are shown on the right side of the respective input item names.

Incidentally, the ATM operation procedures are structured of a plurality of operation sets consisting of a single procedure or a plurality of procedures possible of being related thereto. Corresponding to this structure, the respective input data columns 87 are disposed in such a state that the plurality of input data columns 87 constituting the operation sets are converged on one side, while the input data columns 87 constituting the operation sets different from each other are arranged at an interval.

For instance, in the example shown in FIG. 7, the operation procedures of "Transfer" comprises an operation set relative to the transfer destination (the remittee), an operation set concerning the amount of money, and an operation set pertaining to the client. In accordance with the structure of the operation sets, the input data columns 87a–87d corresponding the operation set relative to the transfer destination and the input data columns 87f, 87g corresponding to the operation set pertaining to the client, are so arranged as to form two groups. On the other hand, spaces (blanks) are provided between the input data column 87d and the input data column 87e, and between the input data column 87e and the input data column 87f in order to make the user recognize that these operations sets are different from each other.

Accordingly, the ATM user is able to easily grasp the number of operations procedures, the number of operation sets, the sequence of the operation procedures and the input items by observing the procedure indicator 82.

<Background Color of Procedure Numbers>

Referring to FIG. 7, background colors of the respective procedure numbers are, though unable to show them, displayed in different colors corresponding to the operation sets. To be specific, the background colors of the respective procedure numbers in the input data columns 87a–87d are set with red gradations based on the sequence of numbers, and the background color of the procedure numbers in the input data column 87e is set in green. The background color of the procedure numbers in the input data columns 87f, 87g is set with blue gradations based in the sequence of numbers.

With those settings, the ATM user is able to grasp which operation set the name of input item belongs to without comprehending a meaning (concept) of the operation set. Further, as the operation procedure advances, the background color of the procedure number changes from a color having a long wavelength to a color having a short wavelength, and hence the user is capable of grasping and predicting from the background colors of the procedure numbers a condition of how the operation procedure advances.

Moreover, the basic color of the background 81 on the dealing screen 70 is contrived to change corresponding to the background color of the procedure number. For example, if the background color of the procedure number corresponding to the operation procedure that is being implemented at the present is a red color, the basic color of the background 81 becomes red. With this contrivance, it is feasible for the user to easily grasp which operation set the operation being executed at present belongs to.

<Gazing Area>

Referring to FIG. 7, a gazing area 80 is set in a strip region of approximately 3/10 through approximately 4/10 from an upper edge of the dealing screen 70. In terms of human engineering, this gazing area 80 is conceived as a region in which a human being is able to accept the information displayed in the dealing screen 70 at a high accuracy. The above-mentioned input item display area 73 and input data display area 74 (see FIG. 5), are disposed in this gazing area 80 (corresponding with the specified area of the present invention).

Thus, the laterally elongate gazing area 80 is set on the dealing screen 70, the operation explanatory area 72 is set on the upper side of the gazing area 80, and the operation area 75 is set on the lower side of the gazing area 80, thereby restraining a useless movement of a lien of sight. Accordingly, it is feasible to enhance a visual recognizability on the dealing screen 70 and ameliorate difficulties to comprehend the dealing the screen 70 and to perform the operations.

Each input data column 87 is displayed in the gazing area 80 (the input item display area 73 and the input data display area 74) in accordance with the operation procedures. For instance, as shown in FIG. 7, if the dealing is "Transfer", the input data column 87 (the input data column 87a) in which the procedure number "1" is indicated for the first time, is displayed in the gazing area 80. Thereafter, when the data input relative to the procedure number "1" is ended and the operation procedure advances next, as shown in FIG. 8, the procedure indicator 82 is scrolled on the upper side of the screen, and the input data column (the input data column 87b) in which the next procedure number "2" is indicted, is displayed in the gazing area 80.

Namely, the procedure indicator 82 is scrolled upward on the dealing screen 70 every time the operation procedure advances, and the input data column 87 in which the next procedure number is indicated, is displayed in the gazing area 80. Among respective pieces of data indicated in the input data columns 87 in the gazing area 80, the procedures number and the input item name are displayed in the input item display area 73 within the gazing area 80, and the character string representing the input data is displayed in the input data display area 74 within the gazing area 80.

Thus, the input data column 87 showing the operation procedure that is in the process of advancement at present, is displayed in the gazing area 80 on the dealing screen 70. Accordingly, as far as the ATM user gazes at only the gazing area that is easiest to see on the dealing screen 70, the user is capable of easily grasping the operation procedure being now conducted by the user himself or herself and a condition of advancement of the operation procedure from the procedure number and the input item name which are displayed in the gazing area 80. Further, the user is able to intuitively grasp that the operation procedure advances by scrolling the procedure indicator 82 with the advancement of the operation procedure.

Moreover, when scrolling the procedure indicator 82, a signal sound is emitted from the ATM. This function is actualized by giving in an indication to the voice output unit 60 from the control unit CPU shown in FIG. 3 and causing the voice output unit 60 to output the signal sound when executing the process of scrolling the procedure indicator 82. As described above, when the signal sound is outputted with the scrolling over the procedure indicator 82, the user pays attention onto the dealing screen 70, reacting to the signal sound. With this operation, there comes to a state in which the user watches the procedure indicator 82 in the process of being scrolled, and hence it is feasible to make the user adequately grasp that the operation procedure advances. Accordingly, an operation time of the ATM can be reduced by eliminating a time loss caused in the case of the user being unaware of the advancement of the operation procedure.

Further, as in the example shown in FIG. 7, if the number of the operation procedures of the dealing is small, all the input data columns 87 forming the procedure indicator 82 are displayed on the display device 1 when the dealing is started. Whereas if the number of the operation procedures of the dealing is large, and if all the input data columns 87 can not be displayed at one time on the display device 1 when starting the dealing, only the input data columns 87 displayable are, as shown in FIG. 9(a), indicated on the display device 1.

The above-mentioned function is actualized by, e.g., in the manner which follows. That is, the display data processing unit 21 shown in FIG. 1 retains a number (a threshold value) of the input data columns 87 that can be displayed at one time on the display device 1. The display data processing unit 21, upon starting the dealing, receives the data of the relevant procedure indicator 82 from the image data retaining unit 7, and compares the number of the input data columns 87 constituting the same procedure indicator 82 with the threshold value described above. At this time, if the number of the input data columns 87 is less than the threshold value, the display data processing unit 21 makes the display device display all the input data columns 87 forming the procedure indicator 82. Whereas if the number of the input data columns 87 is more than the threshold value, the display processing unit 21 has some of the input data columns 87 displayed on the display device 1, which constitute the procedure indicator 82.

Figure 9:
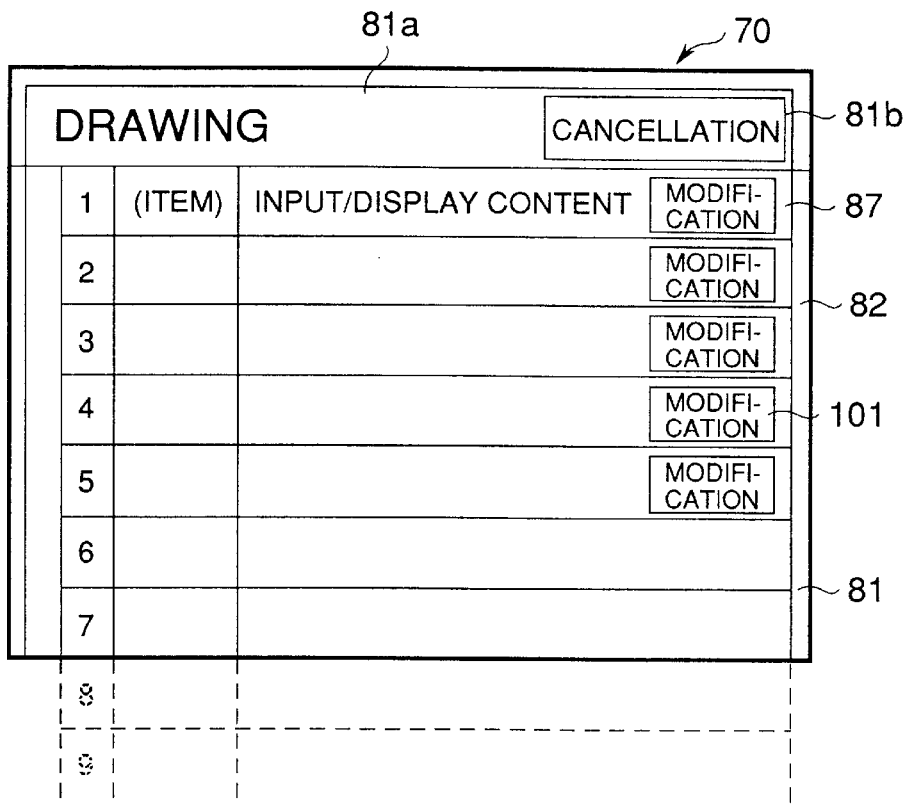
FIGS. 9(a) and 9(b) are explanatory diagram showing an input panel indicator.
Figure 9:
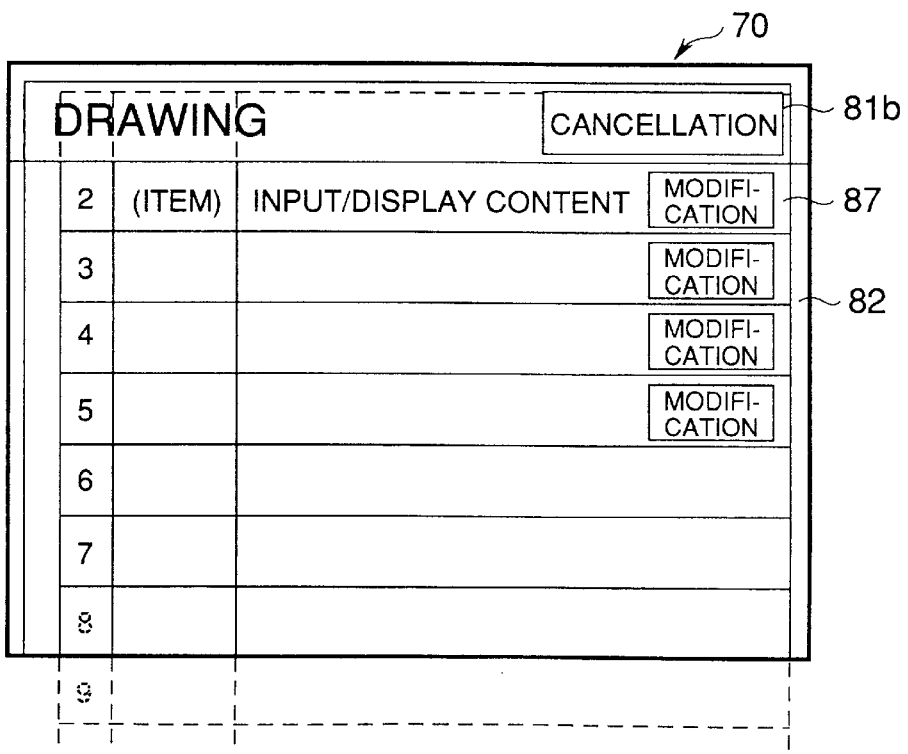

Then, as shown in FIG. 9(b), every time the procedure indicator 82 is scrolled upward on the screen after finishing the one operation procedure, the input data columns 87 unable to be displayed when starting the dealing are displayed. At this moment, a part of the procedure indicator 82 is superposed on the dealing classification display column 81a as a result of the procedure indicator 82 being scrolled upwards on the screen, the area of the procedure indicator 82 which exists in an overlapped range with the dealing classification display column 71a, is deleted from the dealing screen 70.

Figure 16:
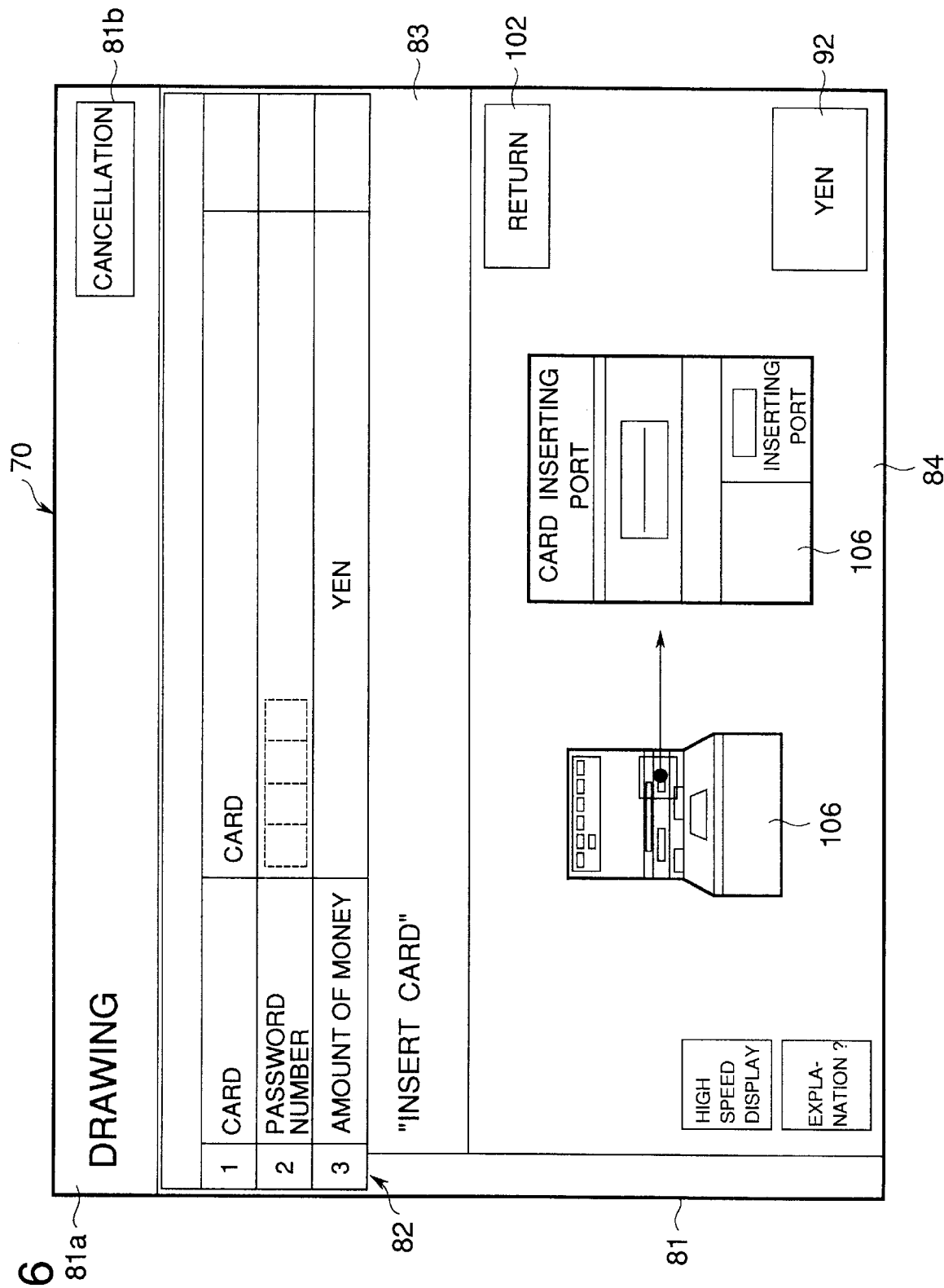
FIG. 16 is an explanatory diagram showing a help display.

Incidentally, if the number of the dealing operation procedures is small (if the operation procedure terminates simply by inputting "Password Number" and "Amount of Repayment Money" as in the case of, e.g., a "Repayment" dealing), the procedure indicator 82 is not scrolled even when the operation procedure proceeds next. In this case, as shown in FIG. 16, the explanation indicator 83 and the input panel indicator 84 are disposed in the lower part of the dealing screen 70 in a state of being contiguous to each other.

The process controller 20 shown in FIG. 1 executes the following processes, thereby actualizing the function described above. To be specific, as explained above, the display data processing unit 21 compares the number of the input data columns 87 forming the procedure indicator 82 the should be displayed, with the threshold value. At this time, if the number of the input data columns 87 is greater than the threshold value, the display data processing unit 21 executes the scrolling process of the procedure indicator 82 every time the operation procedure advances next. While on the other hand, the display data processing unit 21, if the number of the input data columns 87 is smaller than the threshold value, causes the display device 1 to display the dealing screen 70 shown in, e.g., FIG. 16, and implements no scrolling process of the procedure indicator 82 even when the operation procedure advances.

<Explanation Indicator and Input Panel Indicator>

Referring back to FIG. 6, the explanation indicator 83 is formed in the strip shape extending bilaterally on the dealing screen 70, wherein the character string representing the operational explanation in each operation procedure is displayed (a character string of "Please input the client name and depress the "confirmation" button" in the example shown in FIG. 6). This explanation indicator 83 is disposed in the operation explanatory area 72 shown in FIG. 5 in a state of being superposed on the procedure indicator 82.

Further, the input panel indicator 84 is formed in the rectangular shape, wherein the keys and buttons for inputting the input items displayed in the input item display area 73 (see FIG. 5) are displayed in each operation procedure. This input panel indicator 84 is disposed in the operation area 75 shown in FIG. 5 in the state of being superposed on the procedure indicator 82.

Figure 10:
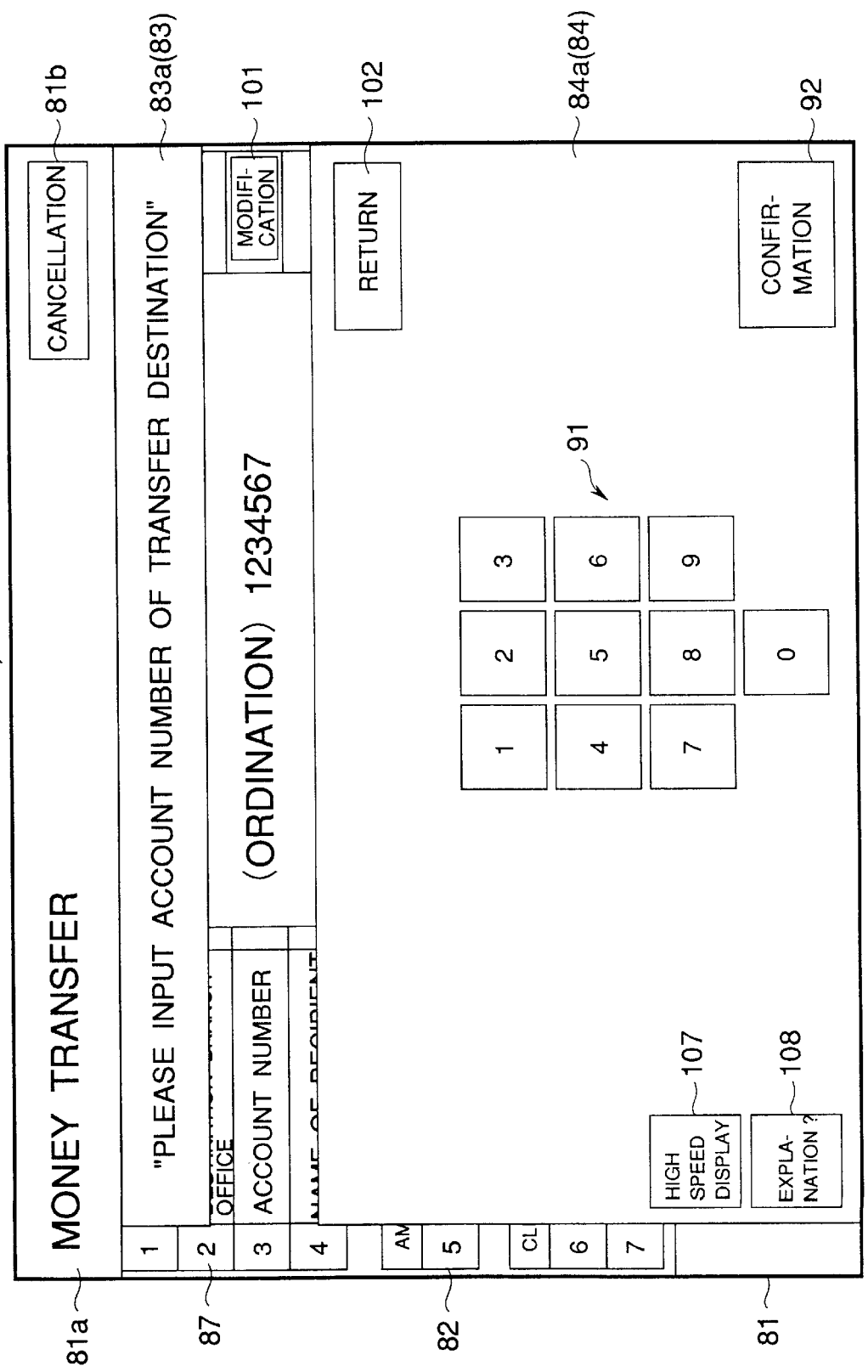
FIG. 10 is an explanatory diagram showing the input panel indicator.
Figure 11:
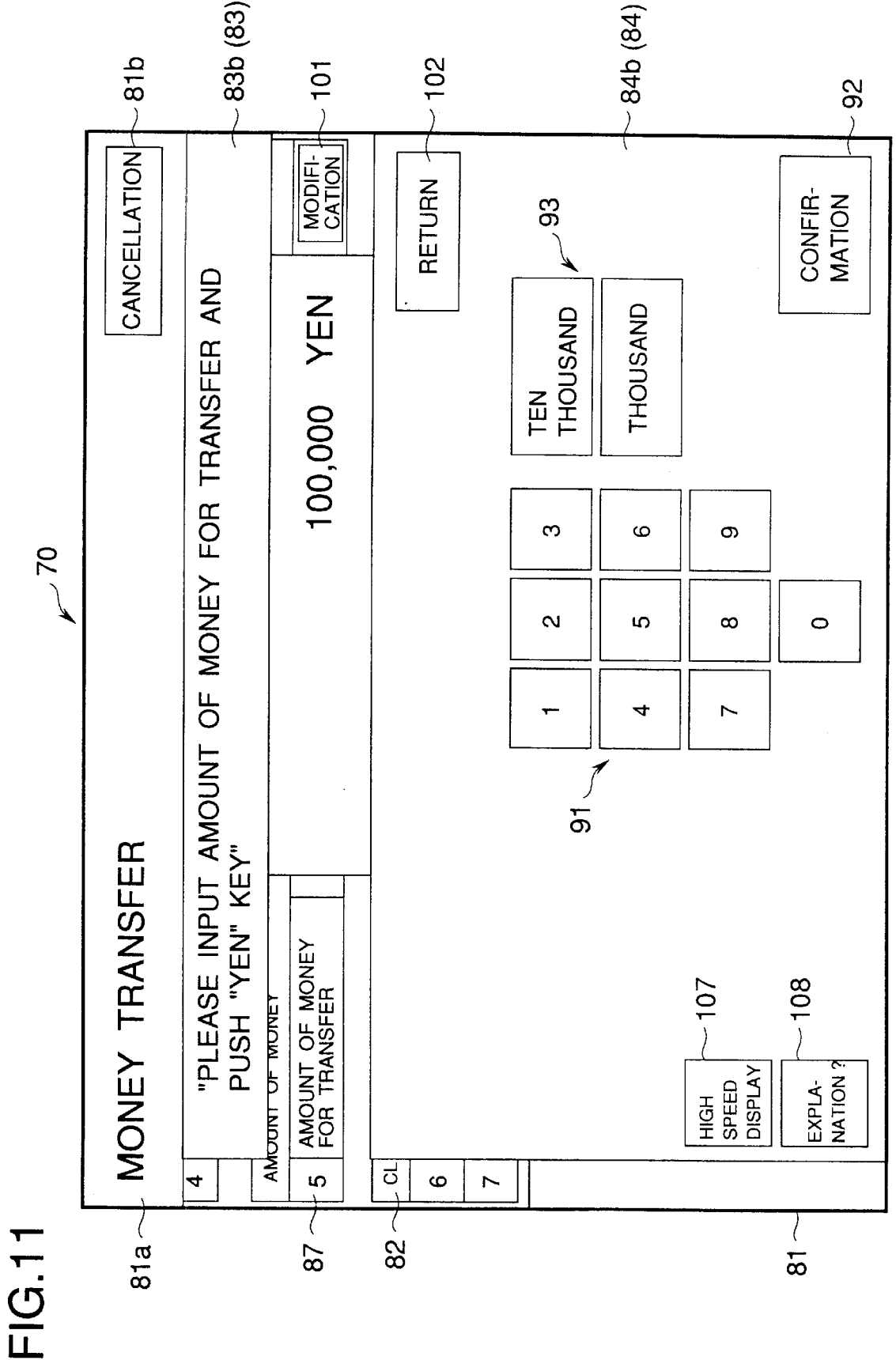
FIG. 11 is an explanatory diagram showing the input panel indicator.
Figure 12:
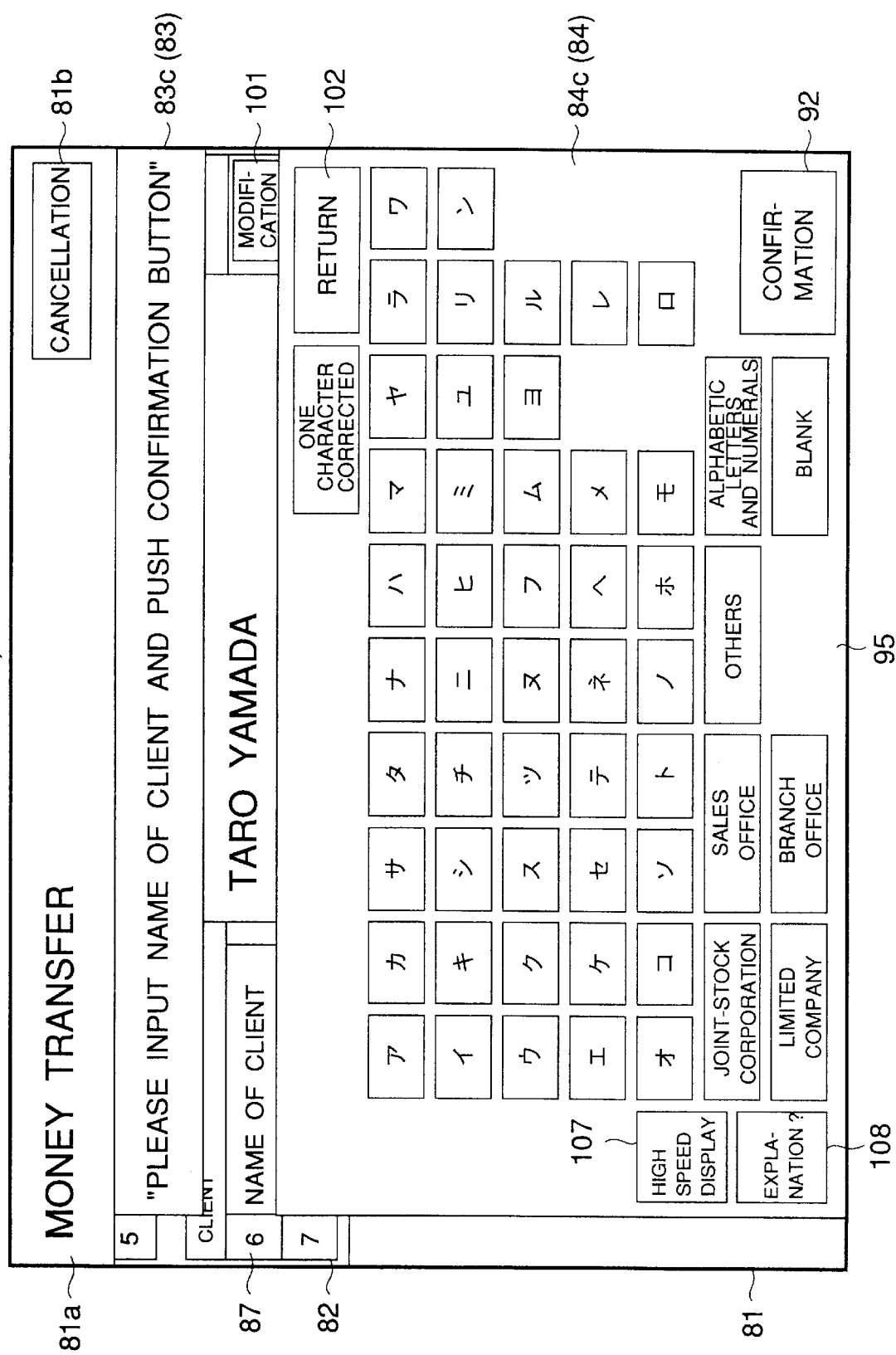
FIG. 12 is an explanatory diagram showing the input panel indicator.

FIGS. 10–12 are explanatory diagrams each illustrating a screen display example of the explanation indicator 83 and the input panel indicator 84. As illustrated in FIGS. 10–12, plural kinds of the explanation indicators 83 and the input panel indicators 84 are prepared corresponding to the user's input items. There are prepared, e.g., an explanation display 83a and an input panel indicator 84a that serve to input an account number (see FIG. 10), an explanation indicator 83b and an input panel indicator 84b that serve to input the amount of money (see FIG. 11), and an explanation indicator 83c and an input panel indicator 84c that serve to input characters (see FIG. 12).

As illustrated in FIG. 10, the input panel indicator 84a is provided with ten keys 91 for inputting the account number, and a first confirmation button 92 for temporarily determining the account number inputted. Further, as illustrated in FIG. 11, the input panel indicator 84b is provided with the ten keys 91 for inputting the amount of money, digit buttons 93 for inputting digits (10,0000 and 1,000), and the first confirmation button 92 for temporarily determining the amount of money inputted. Moreover, as illustrated in FIG. 12, the input panel indicator 84c is provided with a Japanese syllabary key group 94 for inputting the characters, a word key group 95 for inputting specified words (a joint-stock corporation, a limited company, a sales office and a branch office), and the first confirmation button 92.

Thus, the input panel indicator 84 disposed in the operation area 75 is structured as a separate screen element from the procedure indicator 82, and is displayed in the dealing screen in the state of these two screen elements being superposed. It is therefore feasible to increase a rate at which the input panel indicator 84 (the operation area 75) occupies the dealing screen 70. This makes it possible to optimize sizes of the keys and the buttons indicted in the input panel indicator 84 or a layout thereof.

Accordingly, there can be reduced a possibility of a mis-input and a mis-operation due to mis-depressions of the user on the keys and the buttons as well. This is effective particularly to users having a comparatively low degree of familiarization to operate the ATM or declining in terms of visual function and manipulatability of their fingers. Note that icons may be provided as a substitute for the keys and the buttons displayed in the input panel indicator 84.

<Switching of Dealing Screen>

By the way, the above-mentioned background 81 and procedure indicator 82 remain displayed on the display device 1 substantially over an entire period from the start of operation of the ATM by the ATM user to the end of operation. Hence, the ATM user is able to grasp a whole picture of the input operations which will be conducted from now on, and to comprehend a relationship between anterior and posterior items. This enables the user to make psychic preparations for the restive input items (respective operation procedures) in advance of the dealing. Further, when in each operation procedure, it never happens that the user might feel confused and irritating about being unable to grasp a whole process of the operation procedure. Moreover, it is possible to avoid jeopardizing the user to misinterpret a content of the input request and consequently to do the mis-inputting.

By contrast, the explanation indicator 83 and the input panel indicator 84, which come under the sort corresponding to the operation procedure, are displayed on the display device 1 on the occasion of the start of each operation procedure. In the ATM in accordance with the embodiment 1, the dealing screen 70 is switched over by changing the explanation indicator 83 and the input panel indicator 84 corresponding to the operation procedure. Hereinafter, the switchover process of the dealing screen will be explained.

When each operation procedure is started, as shown in FIG. 13, the explanation indicator 83 appears from the lower edge of the screen and continues to move toward the upper edge of the screen till the explanation indicator 83 is embraced by the above-mentioned operation explanatory area 72. Further, simultaneously with or subsequently to the occurrence of the explanation indicator 83, the input panel indicator 84 appears from the lower edge of the screen and continues to move toward the upper edge of the screen till the input panel indicator 84 is embraced by the above operation area 75.

Then, the operation explanatory area 72 accommodates the explanation indicator 83, and the operation area 75 accommodates the input panel indicator 84, at which time a portion of the procedure indicator 82 that exists in the operation explanatory area 72 and a portion thereof that exists in the operation area 75 (the portion overlapped with the explanation indicator 83 or the input panel indicator 84), are brought into a state of being concealed by the explanation indicator 83 or the input panel indicator 84 (see FIG. 10). Wit this arrangement, the ATM user becomes able to visually recognize only the name of the input item displayed in the gazing area 80 among the input item names shown in the procedures display 72. Accordingly, the user can definitely grasp the operation procedure that is being conducted at present.

The explanation indicator 83 and the input panel indicator 84 are, however, set so as not to superpose on the numerals representing the respective procedure numbers in the procedure indicator 82. Hence, the ATM user is capable of grasping the number of the operation procedures even during the inputting process of the data as well as grasping how far the present operation procedure advances.

Thereafter, the data are inputted by use of the input panel indicator 84, and the operation procedure terminates, at which time the explanation indicator 83 and the input panel indicator 84 move toward the lower edge of the screen and disappear from the display device 1. Then, when the operation procedure advances next, the explanation indicator 83 and the input panel indicator that correspond to this operation procedure appear on the dealing screen 70 by the method described above. At this moment, the procedure indicator 82 is scrolled upward on the screen, and the input data column 87 with the next procedure number indicated therein is displayed in the gazing area 80.

What will hereinafter be referred to as a "screen transition" is a combination of the scrolling of the procedure indicator 82 and the switching of the explanation indicator 83 and of the input panel indicator 84, which is carried out when the operation procedure advances.

<Enlarged Display in Gazing Area>

As shown in FIGS. 10–12, each of the input data columns 87 is, when displayed in the gazing area 80, shown with an enlargement of a region existing in the input data display area 74 (see FIG. 5) thereof as well as being shown with the characters representing the input data enlarged larger than the characters indicting the input data in other input data columns 87.

This function is attained by executing a process in which the display data processing unit 21 shown in FIG. 1 displays in enlargement the input data display area 74 of the input data column 87 displayed in the gazing area 80, and also a process of enlarging a character font displayed in the relevant input data display area 74.

Thus, the inputted data is displayed in enlargement, whereby the ATM user can easily read the input data owing to the enlarged display of the data inputted. It is therefore possible to reduce an eye strain of a user with a low visual acuity. Accordingly, it is feasible to decrease the possibility of the mis-input of the data and the mis-operation of the ATM. Further, since the burden on the visual acuity can be decreased, it is possible to prompt the aged or the slight visual handicapped such as amblyopia to utilize the ATM, and a range of the ATM users can be expanded.

Moreover, the characters displayed in the input data display area 74 of the gazing area 80 are shown larger than the characters of the input data in other input data columns 87, and hence there becomes a state of being emphasized more than other input data. Accordingly, the above characters can be easily distinguished from the characters in other input data areas 87, thereby making it feasible to enhance an information recognizable accuracy of the user with respect to the input data.

<Modifying Button>

As shown in FIG. 6, a modifying button 101 is provided on the rightmost side of each of the plurality of input data columns 87. The modifying button 101 is used, if the ATM user mis-inputs the data, for modifying this piece of data. Upon depressing the modifying button 101, the characters representing the inputted data in the input data column 87 to which the concerned modifying button 101 belongs, are cleared, and there becomes a state in which the user can re-input the data.

As described above, the modifying button 101 is provided per input data and disposed adjacent to the data inputted, and therefore the user is able to adequately grasp a meaning of the modifying button 101 and to unmistakably detect this modifying button 101. Further, it is possible to prevent the user from deleting the data not required to be modified by mistakenly pushing other modifying button. Moreover, it is feasible to prevent the user from pushing a canceling button 81b because of mis-recognizing the modifying button 101. Hence, the accuracy of the ATM operation and the operating velocity by the user can be enhanced.

<Confirming button>

As illustrated in FIGS. 10–12, a first confirming button 92 is provided at a right downward corner of each of the input panel indicators 84 (e.g., 84a–84c). Upon pushing the first confirming button 92, a confirmation signal is supplied from the input device 2a to the interruption processing unit 23, and the interruption processing unit 23 gives a confirming process command to the display data processing unit 21.

Thereupon, the display data processing unit 21 executes the confirming process and changes a storage content in the VRAM. Thereafter, when the explanation indicator 83 and the input panel indicator 84 disappear from the dealing screen 70, and the procedure indicator 82 is scrolled downward on the screen. By this process, as illustrated in FIG. 14, there comes a state in which the background 81 and the procedure indicator 82 are displayed on the dealing screen 70, and the data inputted so far are displayed. Then, the user depresses the modifying button 101 provided in each input data area 87 and is thereby capable of modifying the input data corresponding to this modifying button 101.

Moreover, a rectangular confirmation display 104 is displayed under the procedure indicator 82. Shown in the confirmation display 104 are an indication (a character string) for prompting the use to confirm the input data on the left side thereof and a second confirming button 105 on the right side thereof. Then, the ATM user pushes the second confirming button 105, which implies that the relevant operation procedure comes to an end, and the operation procedure advances next.

Thus, the procedure indicator 82 is utilized as a confirmation screen for the input data, and hence the ATM user is capable of confirming and modifying the data inputted so far at one time, and of comprehending the relationship between the sequence of the operation procedures and the input data relative to the operation procedures.

<Canceling Button>

As shown in FIG. 6, a canceling button 81b is provided on the right side of the dealing classification display column 81a. This canceling button 81b is used for canceling the dealing (forcibly finishing the ATM operation). Upon pushing the canceling button 81b, a reset signal is supplied to the interruption processing unit 23 from the input device 2a. Thereupon, the interruption processing unit 23 gives a forcible end command to the display data processing unit 21 on the basis of the reset signal. The display data processing unit 21 thereby forcibly finishes the dealing. Thereafter, the display data processing unit 21 has an unillustrated dealing classification selecting screen displayed on the display device 1.

Thus, a name of the dealing classification and the canceling button 81b are disposed within the same column, and hence the ATM user is able to properly grasp a character meaning of "Cancellation" indicated on the canceling button 81b. Accordingly, it is feasible to prevent the operations conducted so far from coming into a futility because of the ATM user mistakenly pushing the canceling button 81b.

<Return Button>

In the prior art automatic dealing apparatus, the user was unable to see the data already inputted before inputting all pieces of data that should be inputted. Further, even if the user would modify a part of the data already inputted, the prior art automatic dealing apparatus did not incorporate the function responding to the above demand. Therefore, if the user would again perform the operation procedure already conducted, the user has no alternative but to push the "Cancellation" button.

When the user pushes the "Cancellation" button, however, the operation procedures return to the beginning, and the already-inputted data are to be deleted. Therefore, the user must reexecute the operation from the beginning. That is, for instance, if the user is aware of an error in the already-inputted/established data, the user has no alternative but to reexecute the operation by pushing the "Cancellation" button. Consequently, there arises such a case that the user might feel irritating and, due to this irritation, might fall into the mis-inputting of the data and the mis-operation.

Considering this problem, in the ATM in the embodiment 1, the input panel indicator 84 is provided with a return button 102 as shown in FIGS. 10, 11, 12 and 15. when this return button 102 is pushed, the ATM operation procedure moves back to the operation procedure one before. For example, as shown in FIG. 15(a), it is assumed that the return button 102 is pushed in a case where the operation procedure advances to the procedure number "2", and the input data column 87b is displayed in the gazing area 80.

Then, the procedure indicator 82 is scrolled downward on the screen, and, as shown in FIG. 15(b), the input data column 87a marked with the procedure number "1" defined as the operation procedure one before, is displayed in the gazing area 80. At this time, the already-inputted data are displayed in the input data display area 74 of the input data column 87a.

The above-described function is actualized in the manner which follows. To be specific, the data inputted in each operation procedure is retained in an unillustrated storage device of the processing controller 20 shown in FIG. 1. Upon pushing the return button 102, the interrupt signal is inputted to the interruption processing unit 23 from the input device 2a. The interruption processing unit 23 gives the display data processing unit 21 a command (a procedure return command) purporting that the operation procedure should be moved back to the procedure one before in accordance with the interruption signal. The display data processing unit 21, based on the procedure return command, returns a content on the dealing screen to the operation procedure one before, the reads the relevant input data from the unillustrated storage device and has the input data displayed on the display device 1. Note that the input data retained in the unillustrated storage device are erased upon a termination of the dealing (the ATM operation).

Further, when the return button 102 is depressed, the explanation indicator 83 and the input panel indicator 84 are changed to those corresponding to the operation procedure one before. At this time, the user pushes the modifying button 101 in the gazing area 80, in which case the already-inputted data can be modified by use of the thus changed input panel indicator 84. Moreover, when pushing the return button 102 provided in the changed input panel indicator 84, the operation procedure returns further one before. Accordingly, the user is capable of returning the operation procedure to any one of the operation procedures that have already been implemented.

Thus, according to the ATM in the embodiment 1, the operation procedure can be returned to the already-conducted procedure by pushing the return button 102. Further, when returning the operation procedure, the already-inputted data are displayed in the gazing area 80. Therefore, the confirmation and the reexecution of the operation procedures already implemented can be done per operation procedure. Accordingly, an operability of the ATM user can be enhanced, and, more essentially, it is feasible to avoid the mis-operation and mis-inputting by the user. Furthermore, a sense of security can be given to especially the user having a low degree of familiarization in terms of such a point that the data can be re-inputted.

Moreover, the return button 102 is provided in the same position (at the right upward corner in the input panel indicator 84) irrespective of the sort of the input panel indicator 84. Therefore, the ATM user is able to memorize the position of the return button 102 without particularly being aware of it. Hence, the user can adequately push the return button 102 if the user would return the operation procedure to the procedure already carried out.

<Help Display>

FIG. 16 is an explanatory diagram showing a help display (an explanatory screen) displayed on the dealing screen 70. As shown in FIG. 16, the help display 106 shows an operation that should be done by the ATM user, and is displayed in superposition on the input panel indicator 84. This help display 106 is displayed o the display device 1 by the same process as the process for the screen element on the dealing screen 70.

Referring again to FIG. 16, there are illustrated pictures for explaining a card insertion port. This help display 106, a predetermine d time being displayed when the screen transition terminates, disappears from the dealing screen 70 after the predetermined time elapses. Note that there are, though not illustrated, prepared the help displays 106 consisting of character strings.

<High Speed Display Button and Detailed Explanation Button>

As shown in FIGS. 10–12 and 16, a high speed display button 107 and a detailed explanation button 108 are provided at the left downward corner in the input panel indicator 84. When pushing the high speed display button 107, each operation procedure is changed from a normal mode to a high speed mode. Namely, the number of indications of the help display 106 in the respective operation procedures is reduced, and the screen transition is carried out at a high speed. Note that the change to the high speed mode is executed by setting ON a well-experienced user flag retained in the control unit CPU (the central processing unit 3).

On the other hand, when the detailed explanation button 108 is depressed, the operation procedure is changed from the normal mode to a detailed explanation mode. Namely, there is displayed at a lower speed a condition of how the screen transition is effected than in the normal mode, and there increase the number of sorts and the number of indications of the help display 106 and in the respective operation procedures. Further, a character string of a detailed explanation relative to the operation is properly displayed on the dealing screen 70.

Note that upon pushing the high speed display button 107 when in the high speed mode, the high speed mode reverts to the normal mode. Moreover, upon pushing the high speed display button 107 when in the detailed explanation mode, the detailed explanation mode is changed to the high speed mode. While on the other hand, upon pushing the detailed explanation indicator button 108 when in the detailed explanation mode, the detailed explanation mode returns to the normal mode. Further, upon pushing the detailed explanation indicator button 108 when in the high speed mode, the high speed mode is changed to the detailed explanation mode.

Thus, since the high speed display button 107 and the detailed explanation button 108 are provided, the user can operation the ATM by selecting the mode corresponding to the degree of familiarization thereof. Then, the user is capable of reducing the operation time with the operation performed in the high speed mode. Moreover, the user is able to surely precisely execute the operation with the operation performed in the detailed explanation mode, whereby the mis-operation and the mis-inputting can be avoided.

[ATM Operation Procedure]

Figure 17:
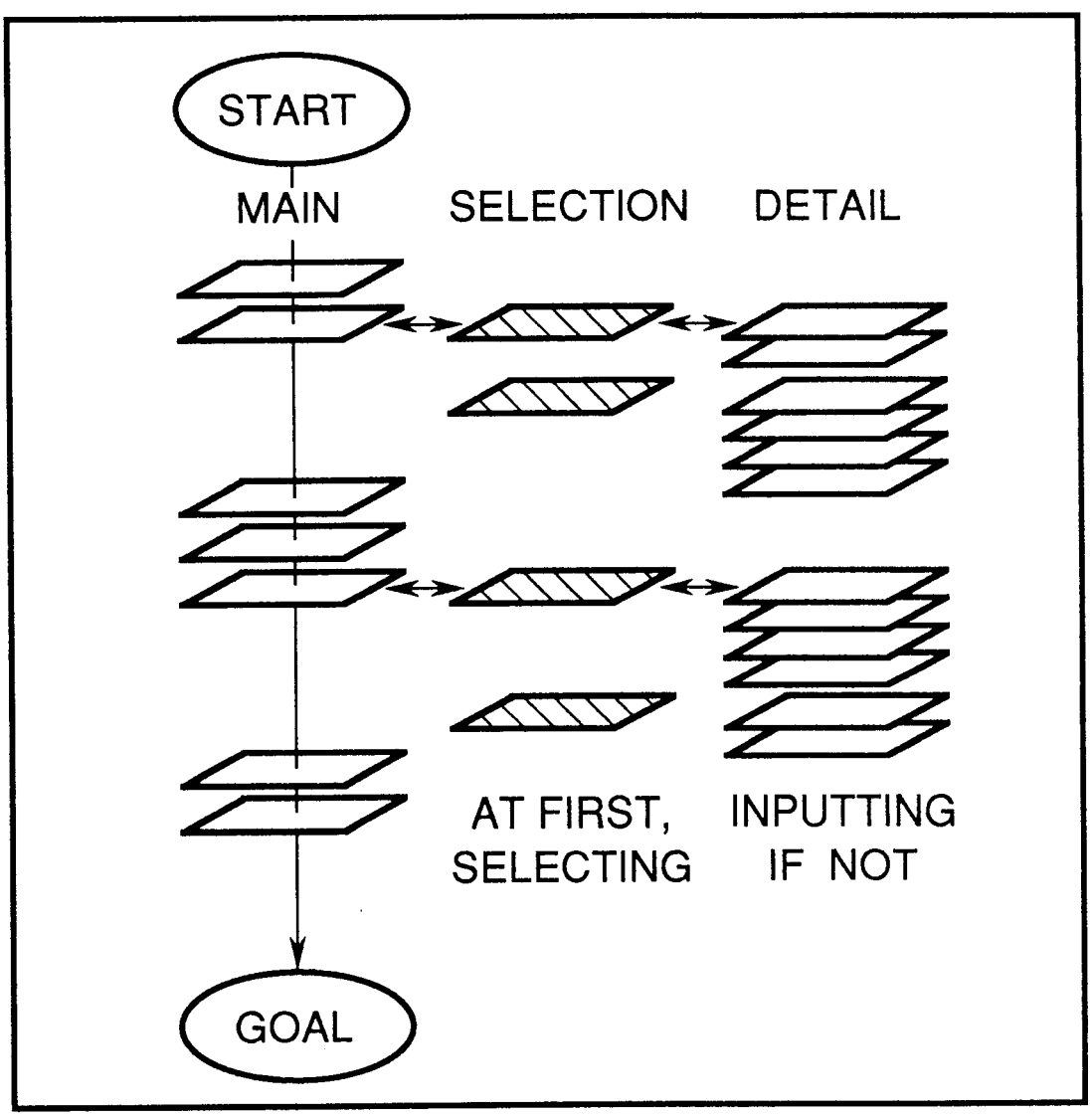
FIG. 17 is a conceptual diagram showing an operation procedure.

FIG. 17 is a conceptual diagram showing the operation procedure in the above-described ATM. FIG. 18(A) and FIG. 18(B) is a diagram showing an example of the operation procedures in the ATM. As shown in FIG. 17, the operation procedures of each dealing are multi-hierachized in the ATM in accordance with the embodiment 1. More specifically, the operation procedure is structured of a main procedure layer (a shortest sequence), a selecting procedure layer (a subsequence) and a detailed procedure layer (a subsequence).

The main procedure layer consists of shortest procedures (procedures at the minimum required). The selection procedure layer is formed of procedures added to the operation procedure through a selection of the user. The detailed procedure layer is constructed of a plurality of procedures into which the respective procedures in the selection procedure layer are further itemized, which itemized procedures are added to the operation procedures through a selection by the user. Thus, the operation procedures are multi-hierachized, and whether or not the procedures belonging to the selection procedure layer and to the detailed procedure layer are added to the operation procedures, is entrusted to the selection by the user. The user is therefore able to implement the ATM operation (the dealing) in the operation procedures corresponding to the degree of familiarization of the user himself or herself.

Figure 18:
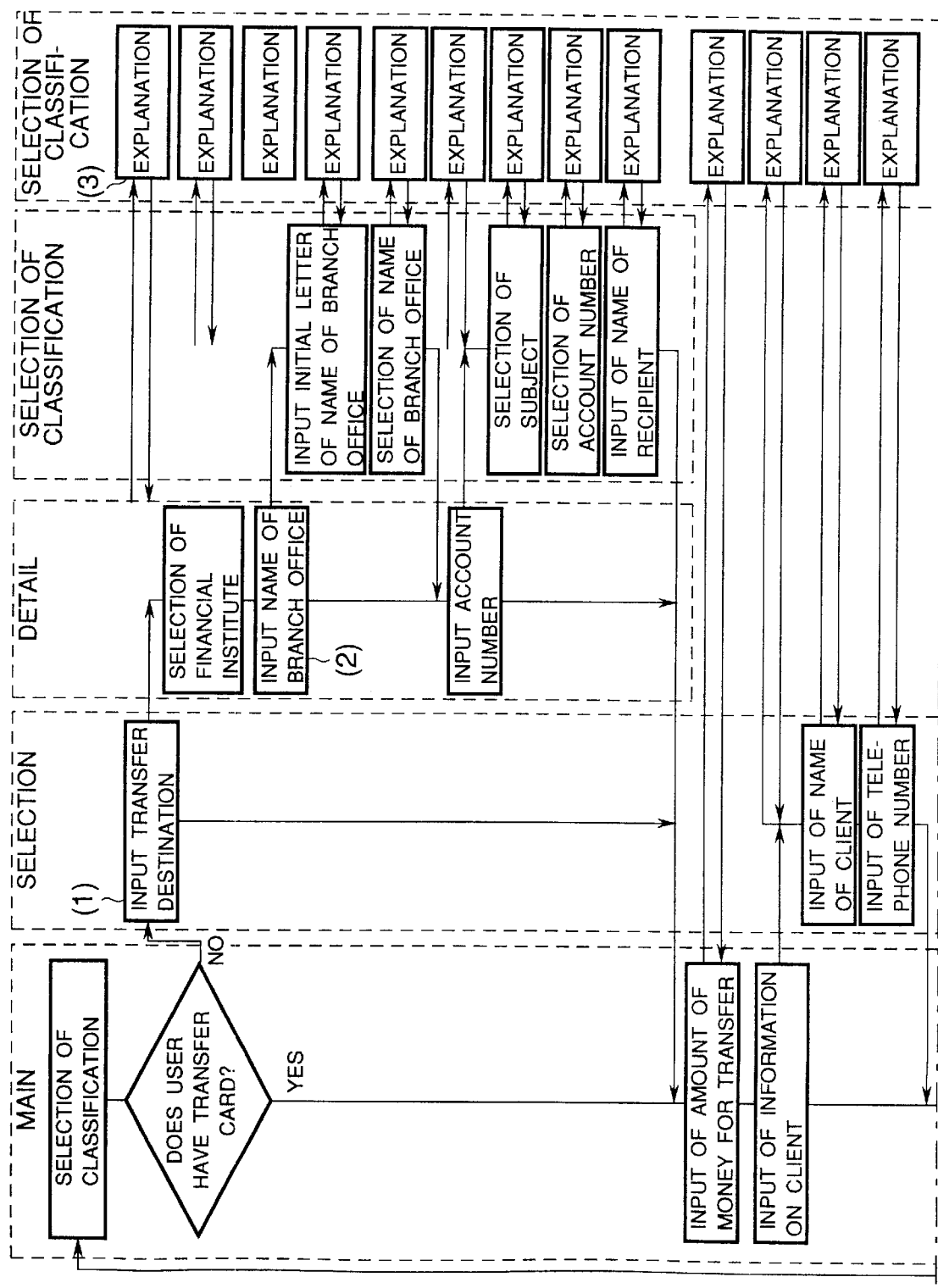
FIG. 18(A) and FIG. 18(B) is a diagram showing an example of the operation procedure.

FIG. 18(A) and FIG. 18(B) shows the operation procedures in the dealing of "Transfer". These operation procedures are offered to the user by the control unit CPU having the dealing screen 70 displayed on the display device 1. Referring to FIG. 18, a procedure of "Input of Remittee" (see FIG. 18(A)(1)) may be, if the user possesses a transfer card, omitted because of its content being recorded.

This "Input of Remittee" procedure consists of three procedure such as "Selection of Financial Institute", "Input of Branch Office Name" and "Input of Account Number" of the remittee. Incidentally, the "Input of Remittee" procedure can be, if the user is well accustomed to the dealing of "Transfer", processed as one procedure.

Therefore, the control unit CPU gets the procedures ("Selection of Financial Institute", "Input of Branch Office Name" and "Input of Account Number") as those omitted, displayed on the dealing screen 70 of the display device 1, and the "Input of Remittee" procedure is displayed as the one that can be processed at one time. There is further displayed a purport that one of the procedure to be omitted and the "Input of Remittee" procedure should be selected.

Herein, when the "Input of Remittee" procedure is selected, it follows that the user, after executing the operation in the "Input of Remittee" procedure, advances the operation procedure to a next procedure of "Input of Transfer Money". On the other hand, when the procedure to be omitted is selected, it follows that the user advances the operation procedure to a next procedure of "Input of Money for Transfer" through the operations in respective procedures of "Selection of Financial Institute", "Input of Branch Office Name" and "Input of Account Number" (see FIG. 18(B)(2)).

Further, upon terminating the procedure of "Selection of Financial Institute", an indication of selecting whether the next procedure is effected with "Input of Branch Office Name" or with "Input of Capital Letter of Branch Office Name" and "Selection of Branch Office Name", is displayed on the display device 1 through the process by the control unit CPU. Corresponding to this, the user selects any one of the procedures and thus advances the operation procedure.

As described above, the complicated procedures consisting of the plurality of operations are processed as the plurality of simple procedures. Accordingly, the shortest procedures are offered to the user having a high degree of familiarization, whereas the user having a low degree of familiarization are made to carry out the ATM operation through the detailed procedures.

Further, the help display 106 (see FIG. 18(B)(3)) of "Explanation" showing a meaning of the input item and the operation in the procedure, is prepared corresponding to each procedure, and the help display 106 of each "Explanation" is displayed on the display device 1 together with the unillustrated procedure selecting indication. There user is thereby capable of prudently properly selecting the procedure.

As discussed above, according to the ATM in the embodiment 1, the ATM user is able to conduct the ATM operation in the operation procedure corresponding to his or her own familiarization degree of the operation, and hence the ATM operability is enhanced.

Embodiment 2

The automatic dealing apparatus (ATM) in accordance with an embodiment 2 will be described. The ATM in the embodiment 2 is, however, substantially the same as the ATM in the embodiment 1, and therefore only different points will be explained.

Figure 19:
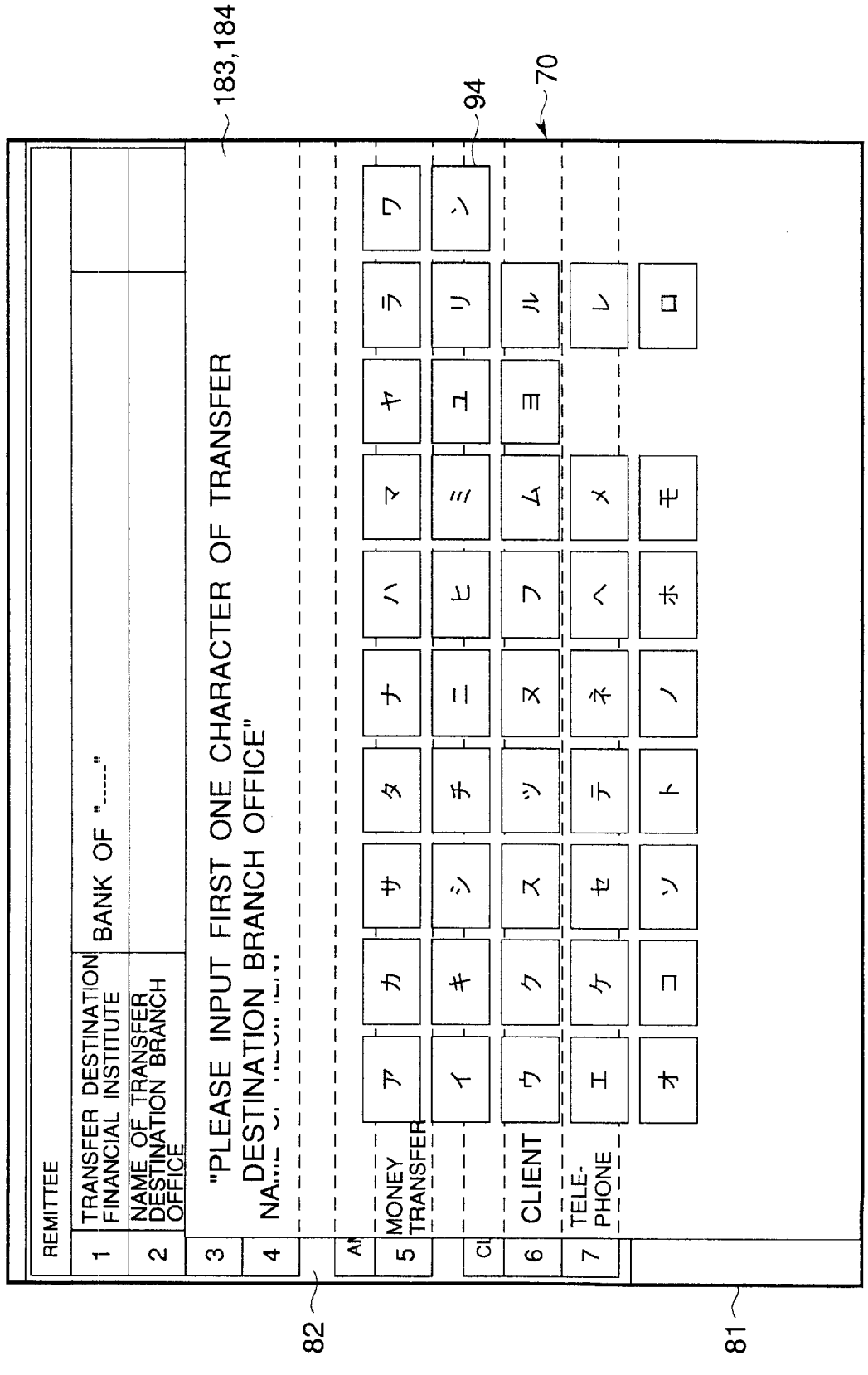
FIG. 19 is an explanatory diagram showing a dealing screen in an embodiment 2.

FIG. 19 is an explanatory diagram showing a part of the dealing screen 70 displayed on the display device 1 of the ATM in accordance with the embodiment 2. Note that the same components as those in the embodiment 1 are marked with the same numerals. Referring to FIG. 19, an explanation indicator 183 and an input panel indicator 184 are displayed on a background 81 and on a procedure indicator 82. The explanation indicator 183 is semi-transparently displayed except for a character string indicating an operational explanation. Further, the input panel indicator 84 is semi-transparently displayed except for a Japanese syllabary key group 94.

Therefore, the ATM user is able of see a content of the procedure indicator 82 through the semitransparently displayed explanation indicator 183 and input panel indicator 184, the procedure indicator 82 existing behind these displays 183, 184. Accordingly, it is possible to confirm an already-inputted result displayed in each input data column 87, and to recognize a whole picture of the input items required to be inputted.

In accordance with the embodiment 2, the ATM user is able to see the display content of the procedure indicator 82 through the explanation indicator 183 and the input panel indicator 184 as well. Hence, the user can grasp the display content of the procedure indicator 82 more adequately than in the embodiment 1. Further, the explanation indicator 183 and the input panel indicator 184 are formed semi-transparently, whereby fragments of information that the single screen has not hitherto accommodated can be displayed one screen. Hence, the information having complicated contents and a large quantity of information can be displayed on one screen. Accordingly, the operation procedures can be simplified.

Note that the explanation indicator 183 and the input panel indicator 184 are so formed as to be displayed semi-transparently in the embodiment 2, however only one of the explanation indicator 183 and the input panel indicator 184 may be structured so as to be displayed semi-transparently.

Embodiment 3

Next, the automatic dealing apparatus (ATM) in accordance with an embodiment 3 will be discussed. The ATM in the embodiment 3 is substantially the same as the ATM in the embodiment 1, and therefore, the explanation of the common points being omitted, only different points will be explained.

Figure 20:
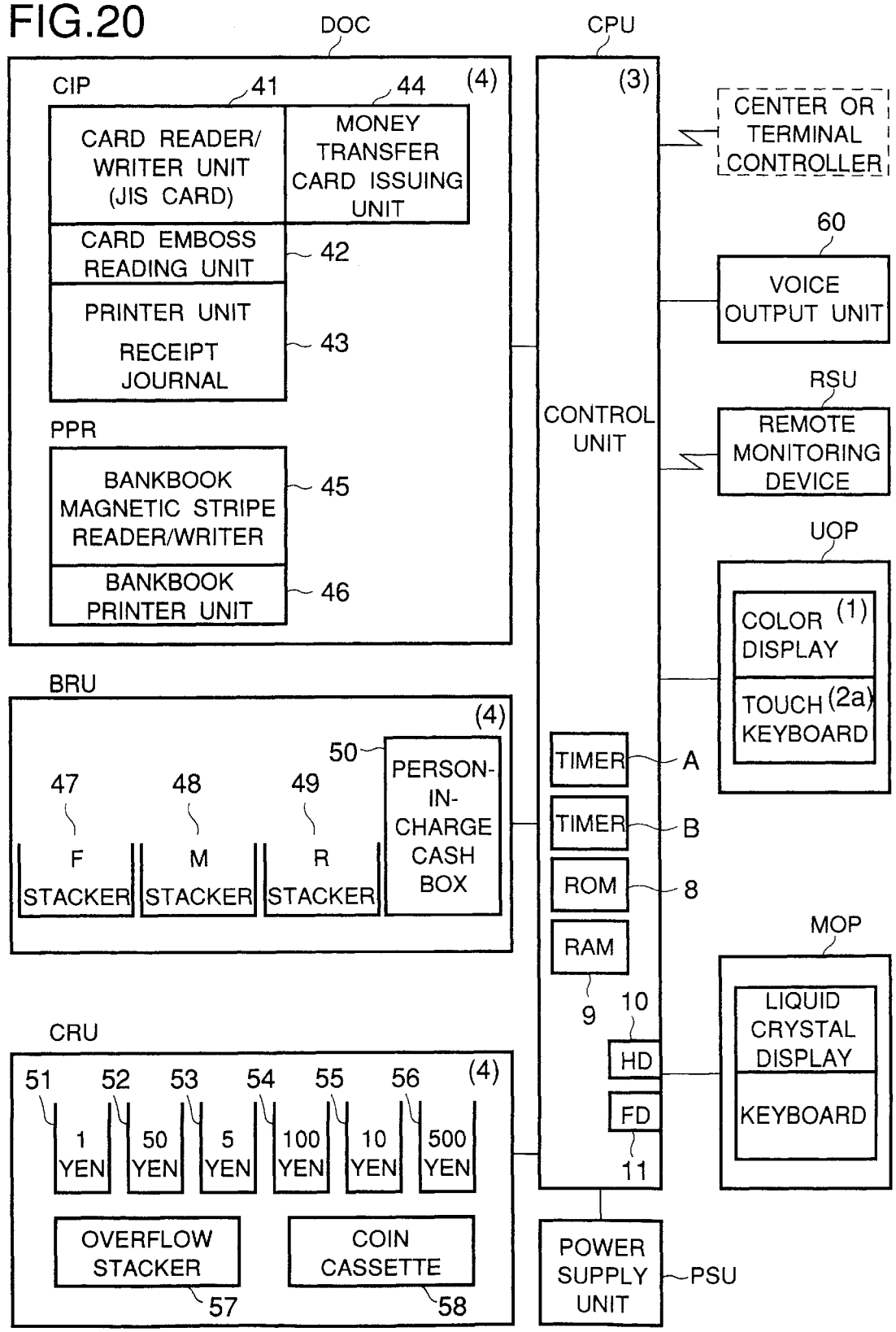
FIG. 20 is a block diagram illustrating a construction of the ATM in an embodiment 3.

FIG. 20 is a block diagram illustrating a construction of the ATM in the embodiment 3. The same components as those in the embodiment 1 are, however, marked with the same numerals with an omission of their explanation. The control unit CPU includes, in addition to the construction explained in the embodiment 1, timers A and B for counting a time. This control unit CPU executes a process (a degree-of-familiarization judging process) for judging a degree of familiarization of the ATM operation of the user.

The degree-of-familiarization judging process is implemented by measuring a speed of the data input by the user. For example, if the user inputs numerals (a password number and an account number etc), the degree of familiarization is judged from a time spent until the user inputs 4-digit numerals. Alternatively, the degree of familiarization is judged from a time till a modifying key for modifying a numeral input is pushed since an arbitrary numeral has been inputted (the degree-of-familiarization judging process based on the numeral input).

Further, in the case of inputting Japanese syllabary characters (a recipient and a client etc), the degree of familiarization is judged from an input time interval of the characters. Alternatively, the degree of familiarization is judged from a time till the modifying key for modifying a character input is pushed since the arbitrary character has been inputted (a degree-of-familiarization judging process based on the character input).

Furthermore, the degree-of-familiarization judging process is executed by assessing a degree of knowledge about financial terms possessed by the user. For instance, the degree of familiarization is judged from a time till one of the keys of the input panel indicator 84 is pushed since a specified financial term has been displayed on the display device 12. For example, financial terms such as "Ordinary Account", "Current Account", "Transfer Card", "Cash Transfer" and "Account Payment" etc may be given as those specified herein (a degree-of-familiarization judging process based on the terms).

Figure 21:
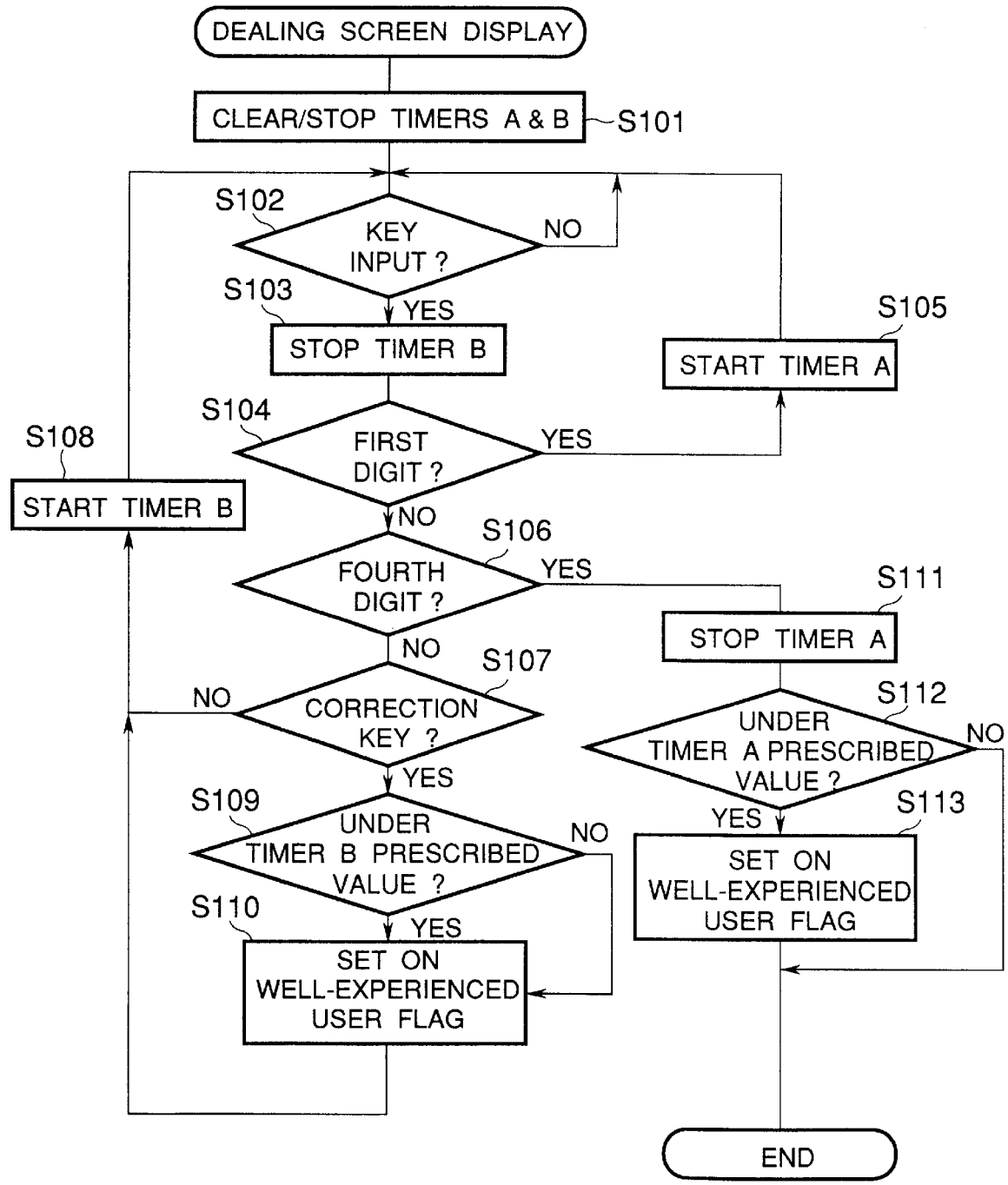
FIG. 21 is a flowchart showing a degree-of-familiarization judging process.

FIG. 21 is a flowchart showing the degree-of-familiarization judging process by the control unit CPU shown in FIG. 20. Referring to FIG. 21, the degree-of-familiarization judging process starts with the control unit CPU having the dealing screen 70 displayed on the ATM display device 1. Herein, however, the judging process based on the numeral input described above is executed, and an unillustrated password number input screen (the dealing screen 70 displayed in the operation procedure of inputting the password number) serving as the dealing screen 70 is displayed on the display device 1.

In step S101, the control unit CPU stops counting processes by the timers A and B, and, after resetting (clearing) the timer A and the timer B, advances the processing to step S102.

In step S102, the control unit CPU waits till any one of the ten keys displayed on the unillustrated password number input screen is pushed. Thereafter, the control unit CPU, when judging that one of the ten keys has been pushed (step S012; YES), advances the processing to step S103. The control unit CPU, when proceeding the processing to step S103, advances the processing to step S104 after stopping the timer B.

In step S104, the control unit CPU judges whether or not a first-digit numeral of the 4-digit password number is inputted by use of the key pushed in step S102. At this time, the control unit CPU, when judging that the first-digit numeral has been inputted (step S104; YES), proceeds the processing to step S105, wherein a time counting process by the timer A is started. Thereafter, the control unit CPU returns the processing to step S102 and waits for the ten key displayed on the unillustrated password number input screen to be pushed. By contrast, the control unit CPU, when judging that the first-digit numeral is not inputted (step S104; NO), advances the processing to step S106.

The control unit CPU, when proceeding the processing to step S106, judges whether or not a fourth-digit numeral of the 4-digit password number is inputted by use of the key pushed in step S102. At this time, the control unit CPU, when judging that the fourth-digit numeral has been inputted (step S106; YES), advances the processing to step Sill. Whereas if it is judged that the fourth-digit numeral is not inputted (step S106; NO), the control unit CPU advances the processing to step S107.

The control unit CPU, when proceeding the processing to step S107, judges whether or not the modifying key displayed on the unillustrated password number input screen is pushed. At this time, the control unit CPU, when judging that the modifying key is not pushed (step S107; NO), proceeds the processing to step S108, wherein the time counting process by the timer B is started. Thereafter, the control unit CPU returns the processing to step S102, and waits till the ten key displayed on the unillustrated password number input screen is again pushed. While on the contrary, the control unit CPU, when judging that the modifying key has been pushed (step S107; YES), proceeds the processing to step S109.

The control unit CPU, in the case of advancing the processing to step S109, refers to a count time (till the modifying key is pushed upon becoming aware of an error in inputting since a certain numeral has been inputted) of the timer B stopped in step S103, and judges whether or not this count time is equal to a specified value or smaller. At this time, the control unit CPU, when judging that the count time is not under the specified value (step S109; NO), advances the processing to step S108. While on the other hand, the control unit CPU, when making a judgement of being under the specified value (step S109; YES), proceeds the processing to step S110.

The control unit CPU, when proceeding the processing to step S110, assumes that the user is a well-experienced person of the operation (having a high degree of familiarization), and sets ON the well-experienced user flag explained in the embodiment 1. Thereafter, the control unit CPU advances the processing to step S108.

On the other hand, the control unit CPU makes a YES judgement in step S106, and, in the case of proceeding the processing to step S111, stops the timer A to count a time. Thereafter, the control unit CPU advances the processing to step S112.

In step S112, the control unit CPU refers to a count time (required for inputting the 4-digit password number) of the timer A stopped in step S111, and thereby judges whether or not this count time is a specified value or under. At this time, the control unit CPU, when making a judgement of not being under the specified value (step S109; NO), terminates the degree-of-familiarization judging process. While on the contrary, the control unit CPU, when making a judgement of being equal to the specified value or less (step S109; YES), advances the processing to step S113.

The control unit CPU, when advancing the processing to step S113, deems that the user is the well-experienced person of the operation, and sets ON the well-experienced user flag described in the embodiment 1. Thereafter, the control unit CPU terminates the degree-of-familiarization judging process. Upon the end of this degree-of-familiarization judging process, the control unit CPU (the central processing unit 3) launches into a process of having the next dealing screen 70 displayed on the display device 1.

As discussed in the embodiment 1, the well-experienced user flag being set ON, there comes the same state as pushing the high speed display button 107, i.e., the screen transition is conducted at a high speed, and the number of indications of the help display 106 is reduced.

Further, the degree-of-familiarization judging process based on the character input is actualized by the same processing in the flowchart shown in FIG. 21. In the degree-of-familiarization judging process based on the character input, however,the processing starts with displaying on the display device 1 the dealing screen 70 containing the Japanese syllabary input panel indicator 84c. Moreover, the timer A counts a time till a certain item of character data are inputted by four characters. On the other hand, the timer B counts a time till the user becomes aware of an error in inputting the arbitrary character data and therefore pushes the modifying key 101. Then, the specified value used in the process in each of steps S109 and S112, is set as being different from a value in the case of the degree-of-familiarization judging process based on the numeral input.

Figure 22:
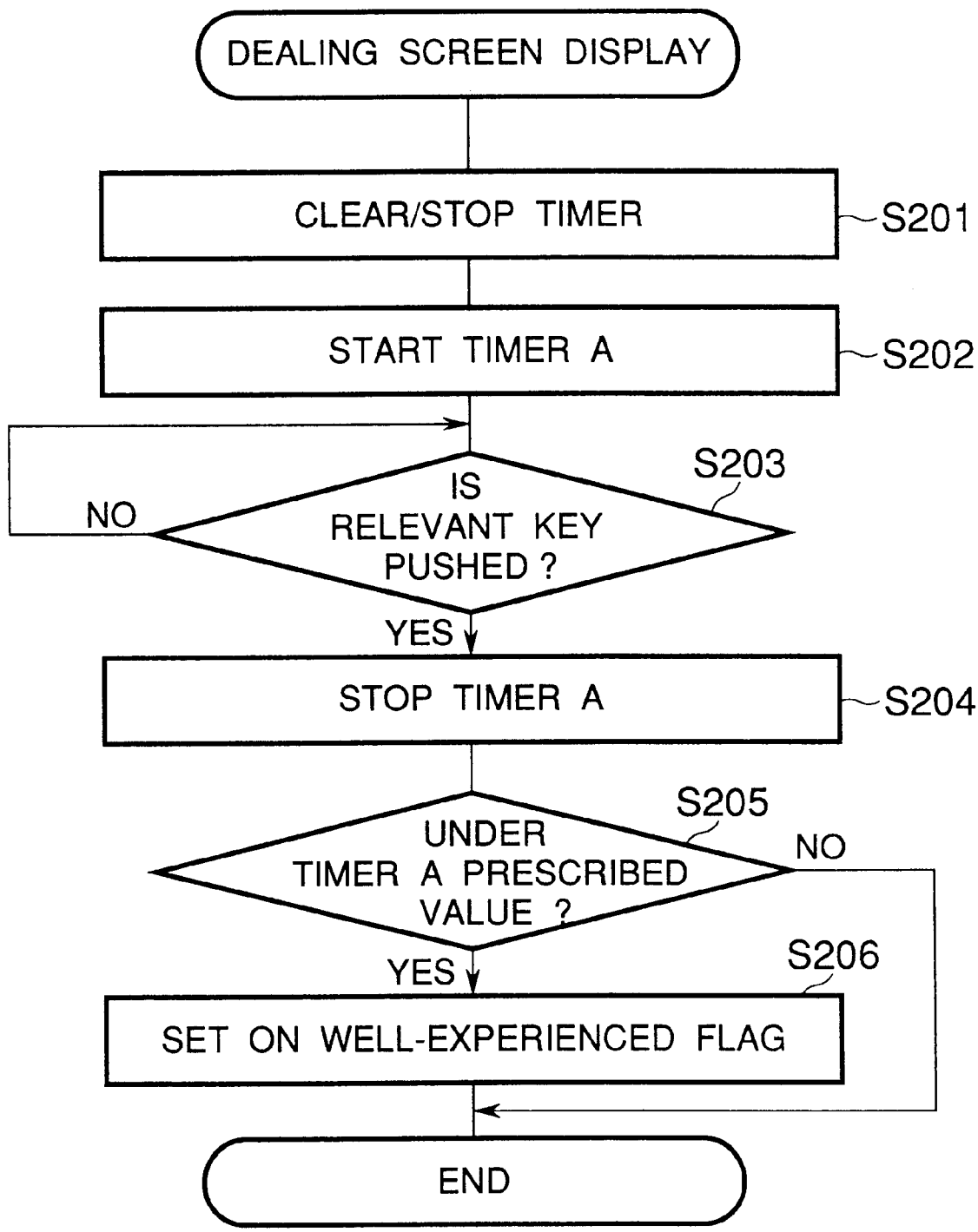
FIG. 22 is a flowchart showing the degree-of-familiarization judging process.

FIG. 22 is a flowchart showing a degree-of-familiarization judging process based on the terms. This judging process is started by displaying the display device the dealing screen 70 containing the input panel indicator 84 in which keys for inputting specific terms are laid out.

Upon the start of the process, the control unit CPU stops and resets (clears) the timer A (step S201), and thereafter starts the timer A to count a time (step S202). Subsequently, the control unit CPU judges whether or not the key for inputting the specific term is pushed (step S203). At this time, the control unit CPU, when judging that the same key has been pushed (step S203; YES), advances the processing to step S204. Whereas if a judgement is made such that the same key is not pushed (step S203; NO), the process in step S203 is repeatedly executed till a YES judgement is made in step S203.

The control unit CPU, when advancing the processing to step S204, stops the timer A to count the time. Subsequently, the control unit CPU judges, referring to the count time by the timer A, whether or not this count time is under the specified value. At this moment, the control unit CPU, when judging that the count time is not under the specified value (step S205; NO), terminates this judging process. While on the contrary, the control unit CPU, when making a judgement of being under the specified value (step S205; YES), proceeds the processing to step S206.

The control unit CPU, in the case of proceeding the processing to step S206, assumes that the user is the well-experienced person of the operation (exhibiting the high degree of familiarization), and sets ON the well-experienced user flag explained in the embodiment 1. Thereafter, the control unit CPU terminates this judging process.

Effects in the embodiment 3 are substantially the same as those in the embodiment 1. If the degree of familiarization with the operation of the ATM user is judged to be high, however, the operation procedures are simplified, and the screen transition is speeded up. Accordingly, the user having the high degree of familiarization is capable of operating the ATM in the simplified operation procedures. On the other hand, the user having the low degree of familiarization is able to operate the ATM in the detailed operation procedures. Namely, in accordance with the embodiment 3, the operation procedures corresponding to the degree of familiarization of the suer can be automatically offered. Accordingly, a majority of users are able to smoothly operate the ATM.

Note that the respective specified values used in the degree-of-familiarization judging processes described above can be properly set. Hence, a difference between the degrees of familiarization of the operation due to a local difference can be absorbed. For instance, there a good number of well-experienced users of the operation in the vicinity of a terminal station in a city area, so that each of the specified values is set in a shorter time than in the local area. In the local area, however, there are a less number of well-experienced users of the ATM operation than in the city area, and hence each of the specified values is set in a longer time than in the city area.

Embodiment 4

Next, the automatic dealing apparatus (ATM) in accordance with an embodiment 4 will be described. The prior at automatic dealing apparatus, if there is no data input from the user for a predetermined time during a process of the dealing, defines a time-out period to cancel the whole dealing process. Then, the automatic dealing apparatus prompts the user to input the data by emitting an alarming sound in a proper time (e.g., five seconds before the time-out) before the time-out on the basis of the time-out period. Then, if no input is given even after the alarming sound, the ATM forcibly terminates the dealing process upon the time-out. Such a process is effective in a case where the user discontinues halfway the ATM operation and becomes absent, and in a case of intentionally implementing the forcible termination of the process upon the time-out.

Provided that the user can not determine which operation the user should conduct and therefore unable to input the data, however, the alarm is nothing but to get the user confused. That being the case, it happened that the user had a complaint of being unable to perform what is able to do because of having fallen into a panic due to the alarm, or that the user has a sense of being controlled by the machine. This might lead to a possibility of an underlying cause for the user not to immediately utilize the ATM.

The ATM in accordance with the embodiment 4 is contrived in order to obviate the problem given above. The ATM in the embodiment 4 has, however, substantially the same construction as that of the ATM in the embodiment 1, and therefore, the explanation of the common pints being omitted, different points will be explained.

Figure 23:
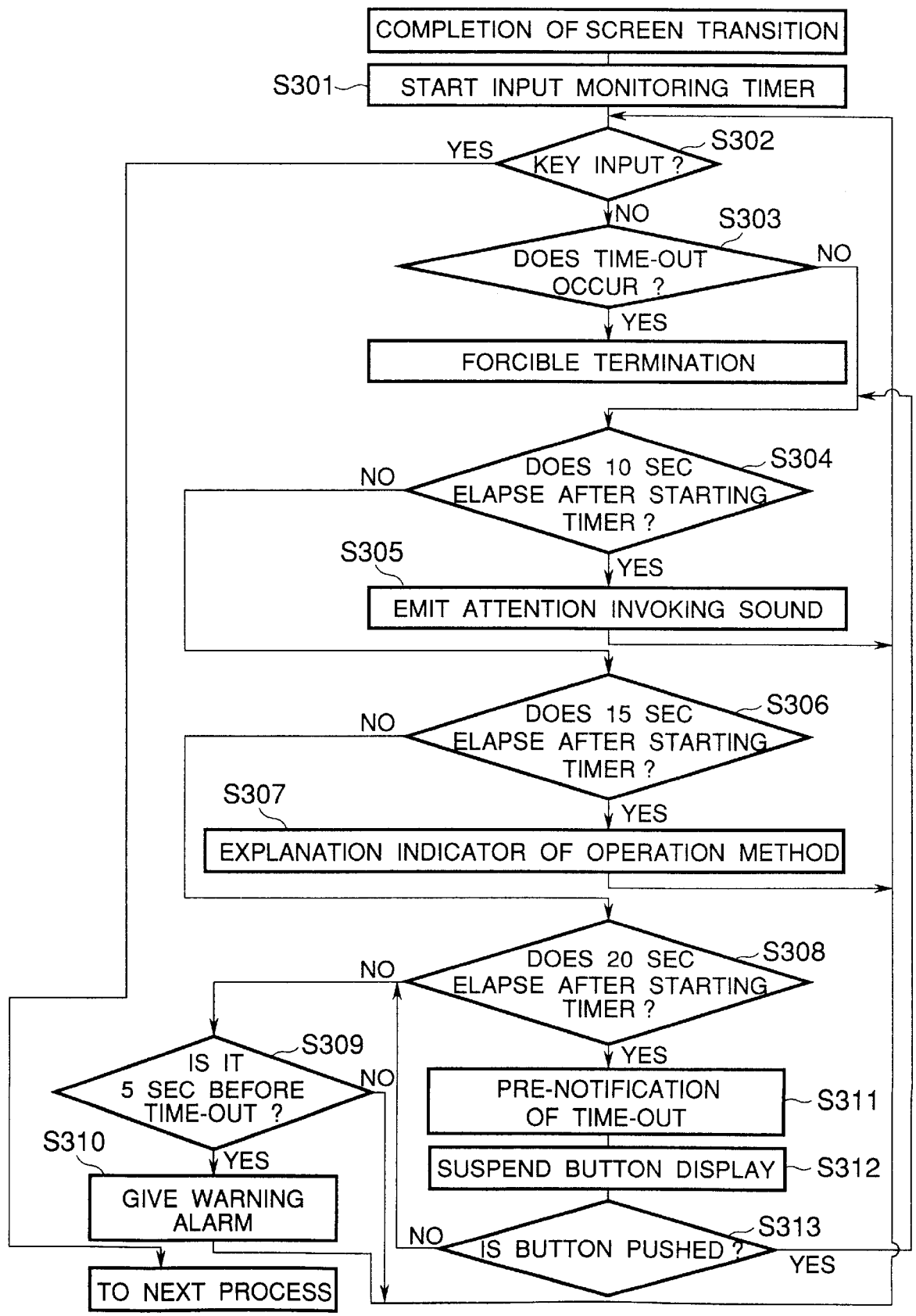
FIG. 23 is a flowchart showing a time-out process.

FIG. 23 is a flowchart showing a process (a time-out process) by the control unit CPU in the embodiment 4. This time-out process starts with a completion of the screen transition of the dealing screen 70.

To begin with, the control unit CPU actuates an unillustrated its own input monitoring timer (step S301). Subsequently, the control unit CPU judges whether or not there is a key input from the input device 2*a* (step S302). At this time, the control unit CPU, when judging that the here is the key input (step S302; YES), terminates the time-out process, and starts a next process. By contrast, the control unit CPU, when judging that there is no key input (step S302; NO), advances the processing to step S303.

The control unit CPU, in the case of proceeding the processing to step S303, judges whether or not the time-out occurs while the unillustrated input monitoring timer counts a preset time-out period. At this time, the control unit CPU, when judging that the time-out occurs (step S303; YES), terminates this time-out process by forcibly finishing the dealing process. While on the other hand, the control unit CPU, in the case of judging that the time-out does not occur (step S303; NO), advances the processing to step S304.

The control unit CPU, when advancing the processing to step S304, judges whether or not there is an elapsed time of 10 seconds since the unillustrated input monitoring timer has been actuated. At this time, the control unit CPU, when judging that the time of 10 seconds has not elapsed (step S304; YES), gives an indication to the voice output unit 60 shown in FIG. 3, thereby emitting an attention invoking sound (step S305). Thereafter, the control unit CPU returns the processing to step S302. While on the contrary, the control unit CPU, when judging that there is the elapsed time of 10 sec (step S304; NO), advances the processing to step S306.

The control unit CPU, when advancing the processing to step S306, judges whether or not a time of 15 sec elapses since the unillustrated input monitoring timer has been started. At this time, the control unit CPU, when judging that there is not the elapsed time of 15 sec (step S306; YES), gets the help display 106 indicated on the dealing screen 70 of the display device 1 (step S307). After an end of step S307, the control unit CPU, gets the processing back to step S302. In contrast to the above, the control unit, when making a judgement of 15 sec having elapsed (step S306; NO), advances the processing to step S308.

The control unit CPU, when advancing the processing to step S308, judges whether or not a time of 20 sec elapses since the unillustrated input monitoring timer has been started. At this moment, the control unit CPU, when judging that there is not the elapsed time of 20 sec (step S308; YES), advances the processing to step S311. By contrast, the control unit CPU, when making a judgement of 20 sec having elapsed (step S308; NO), proceeds the processing to step S309.

The control unit CPU, when advancing the processing to step S309, judges whether or not it is 5 sec before the unillustrated input monitoring timer counts the time-out period. At this time, the control unit CPU, in the case of judging that it is 5 sec before counting (step S309; YES), issues an operation command to the voice output unit 60, thereby emitting a warning alarm. Thereafter, the control unit CPU gets the processing back to step S302. While on the contrary, the control unit CPU, when judging that it is not 5 sec before counting (step S308; NO), returns the processing to step S302.

On the other hand, the control unit CPU, when advancing the processing to step S311, has a time-out pre-notice (e.g., a character string such as "the time-out is reached several seconds later, and the dealing will be forcibly terminated" etc) displayed on the dealing screen 70, and indicates the voice output unit 60 to output a voice guidance purporting that the time-out will occur. Subsequently, the control unit CPU has an unillustrated suspend button (for extending the time-out period) and an unillustrated indication display (e.g., a character string such as "Please push the suspend button if you want to continue the dealing" etc) displayed on the dealing screen 70 (step S312).

Thereafter, the control unit CPU comes into a state of accepting an input through the unillustrated suspend button for a predetermined time, and, upon a passage of a predetermined time, judges whether or not the unillustrated suspend button is pushed (step S313). At this time, the control unit CPU, when judging that the unillustrated suspend button is not pushed (step S313; NO), advances the processing to step S309. In contrast, the control unit CPU, when judging that the unillustrated suspend button is pushed (step S313; YES), returns the processing to step S304. By this return, the control unit CPU jumps the process in step S303 over to step S304 and executes the process in this step, and hence, the time-out period is extended till a next process in step S303 is executed.

According to the ATM in the embodiment 4, if not data is inputted to the input device 2a after the screen transition has been done, the ATM outputs the attention invoking sound as a first stage; the operating method explanation indicator (the help display 106) is displayed on the display device 1 as a second stage; there are displayed a pre-notice of the occurrence of the time-out and outputted the voice guidance as a third stage; and the warning alarm of the time-out is outputted as a fourth stage. Thus, the information on the forcible termination based on the time-out is supplied stepwise to the ATM user, and therefore the use can perform the operation without undergoing a less sese of psychic oppression than in the prior art.

Further, the help display 106 is shown in step S306, which relieves the user who lacks in the knowledge about the operation, and hence it is feasible to reduce the possibility in which the dealing process might be forcibly terminated by the time-out. Moreover, the unillustrated suspend button is provided, and the time up to the time-out is extended by pushing this suspend button. It is therefore possible to give the user an allowance for striving to comprehend the ATM operating method. Accordingly, a more sense of satisfaction can be given to the user than by the prior art automatic dealing apparatus in which the dealing process inevitably falls into the forcible termination just when the time-out is reached after outputting the alarm.

Embodiment 5

Next, the automatic dealing apparatus (ATM) in an embodiment 5 will be explained. The prior art ATM has no contrivance of emitting the attention invoking sound such as a signaling sound etc when the dealing screen is switched over, and therefore, as it happens, the user is unaware of the fact that the switching process of the dealing screen is ended and that there becomes a state where the data can be inputted, in which case the dealing might require a considerable time of period.

Under such circumstances, the prior art automatic dealing apparatus has such a contrivance that the characters are displayed in enlargement on the dealing screen in order to inform the user of the end of the switching process of the dealing screen and a state where the data can be inputted, or that the attention is invoked by flickering the characters. If the user does not pay attention to the dealing screen on the display device, however, the user might overlook those signals, which is not a sufficient contrivance.

The ATM in the embodiment 5 is contrived to obviate the problem described above. The ATM in the embodiment 5 is substantially the same as the ATM in the embodiment 1, and hence, the explanation of the common points being omitted, and different points will be explained.

Figure 24:
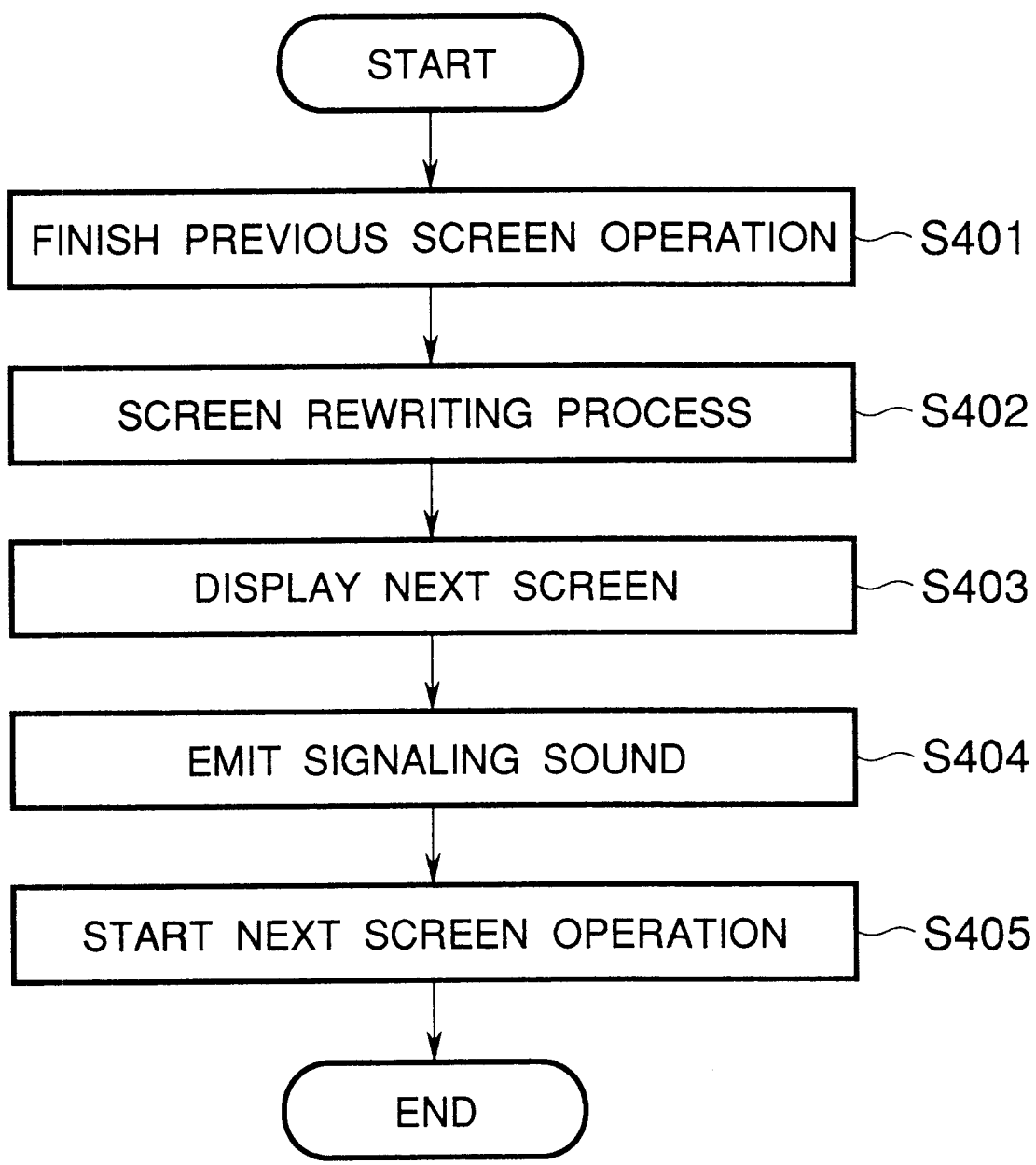
FIG. 24 is a flowchart showing an attention invoking process.

FIG. 24 is a flowchart showing a process (an attention invoking process) by the control unit CPU (see FIG. 3) of the ATM in the embodiment 5. This attention invoking process starts with an end of any one of the operation procedures explained in embodiment 1 (step S401).

The control unit, when advancing the processing to step S402, executes a rewriting process on the dealing screen 70. That is, the control unit CPU implements an internal process (a screen display process: see FIG. 4) for having the screen transition explained in the embodiment 1 displayed on the display device 1.

Subsequently, the control unit CPU transfers data (video signals) on the dealing screen 70 to the display device 1, and has the dealing screen 70 for a next operation procedure indicator displayed thereon (step S403). When the new dealing screen 70 is displayed on the display device 1 by the process in step S403, the control unit CPU given an indication to the voice output unit 60, thereby emitting the signaling sound (step S404). Then, the control unit CPU comes into a state where the user is capable of inputting, i.e. a state of waiting for the data input from the input device 2a (step S405). Thereafter, the user inputs the data, whereby the operation procedure advances.

According to the ATM in the embodiment 5, the signaling sound is emitted on the occasion of the screen transition on the dealing screen 70, and hence the user is caused to pay attention to the dealing screen 70. Further, there becomes the state in which the data can be inputted subsequent to the emission of the signaling sound, so that the user can start inputting the data to the ATM upon the emission of the signaling sound. Therefore, it is possible to decrease the user's operation time of the ATM, and more essentially it is also feasible to make a contribution to an enhancement in terms of an availability factor of the customer in the financial institute.

Embodiment 6

Next, the automatic dealing apparatus (ATM) in accordance with an embodiment 6 will be described. Normally, the ATM adopts such a construction that the data are inputted by pushing the touch panel with a finger, which is provided on the display device. The user is unable to recognize, with a sense of touch, which button and which key displayed on the touch panel the user is pushing because of no rugged portions on the touch panel. Therefore, if the user lets the finger slide while touching on the touch panel, it might happen that a button or key not required to be pushed is depressed. Even when the user pushes an incorrect button or key, however, the user is unable to recognize this with a sense of touch and therefore becomes unaware of this error.

The ATM in the embodiment 6 is contrived to solve the problem given above. The ATM in the embodiment 6 is substantially the same as the ATM in the embodiment 1, and hence, the explanation of common points being omitted, only different points will be discussed.

Figure 25:
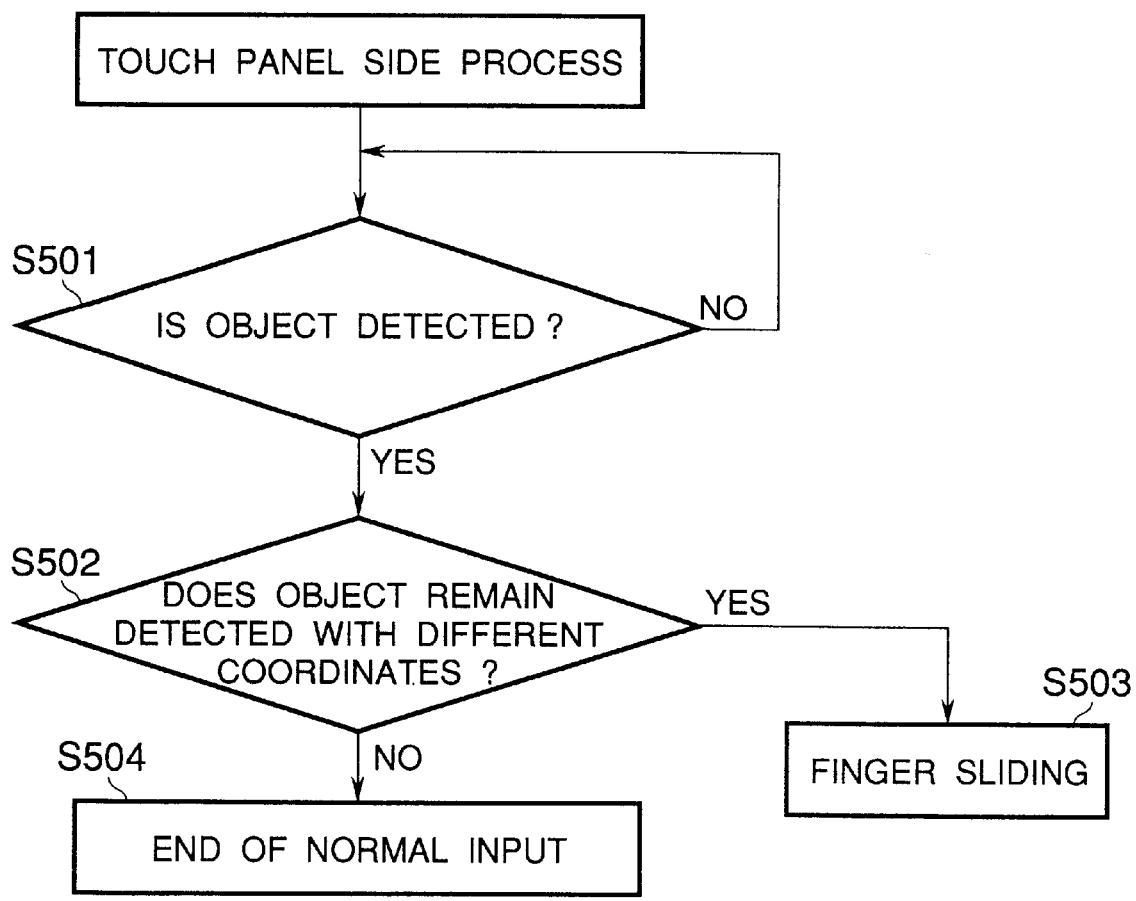
FIG. 25 is a flowchart showing a finger slide judging process.

FIG. 25 is a flowchart showing a finger slide judging process in the customer operation unit UOP shown in FIG. 3. This judging process starts upon becoming such state that the dealing screen 70 is displayed on the display device 1, and that the user is capable of inputting the data from the touch panel of the input device 2a.

Judged in step S501 is whether or not an object touching on the touch panel of the input device 2a is detected. At this time, if the object is detected (step S501; YES), the processing proceeds to step S502. Whereas if the object is not detected (step S501; NO), the process in step S501 is repeatedly executed till a YES judgement is made in step S501.

When the processing advances to step S502, there are judged whether or not the object detected in step S501 remains in an as-detected state, and whether or not coordinates of a contact position between the object and the touch panel are different from contact position coordinates when detected in step S501. At this time, if the object remains in the as-detected state, and if the contact position coordinates are different therefrom (step S502; YES), it must be assumed that the finger slides on the touch panel, and a signal indicating this slide is transferred to the control unit CPU (step S503), and this judging process terminates.

Whereas if the object is not in the as-detected state, or if the contact position coordinates are not different (step S502; NO), the key or button on the input panel indicator 84 is, it is assumed, normally pushed, and a signal indicating this is transferred to the control unit CPU (step S504), thus finishing this judging process.

Figure 26:
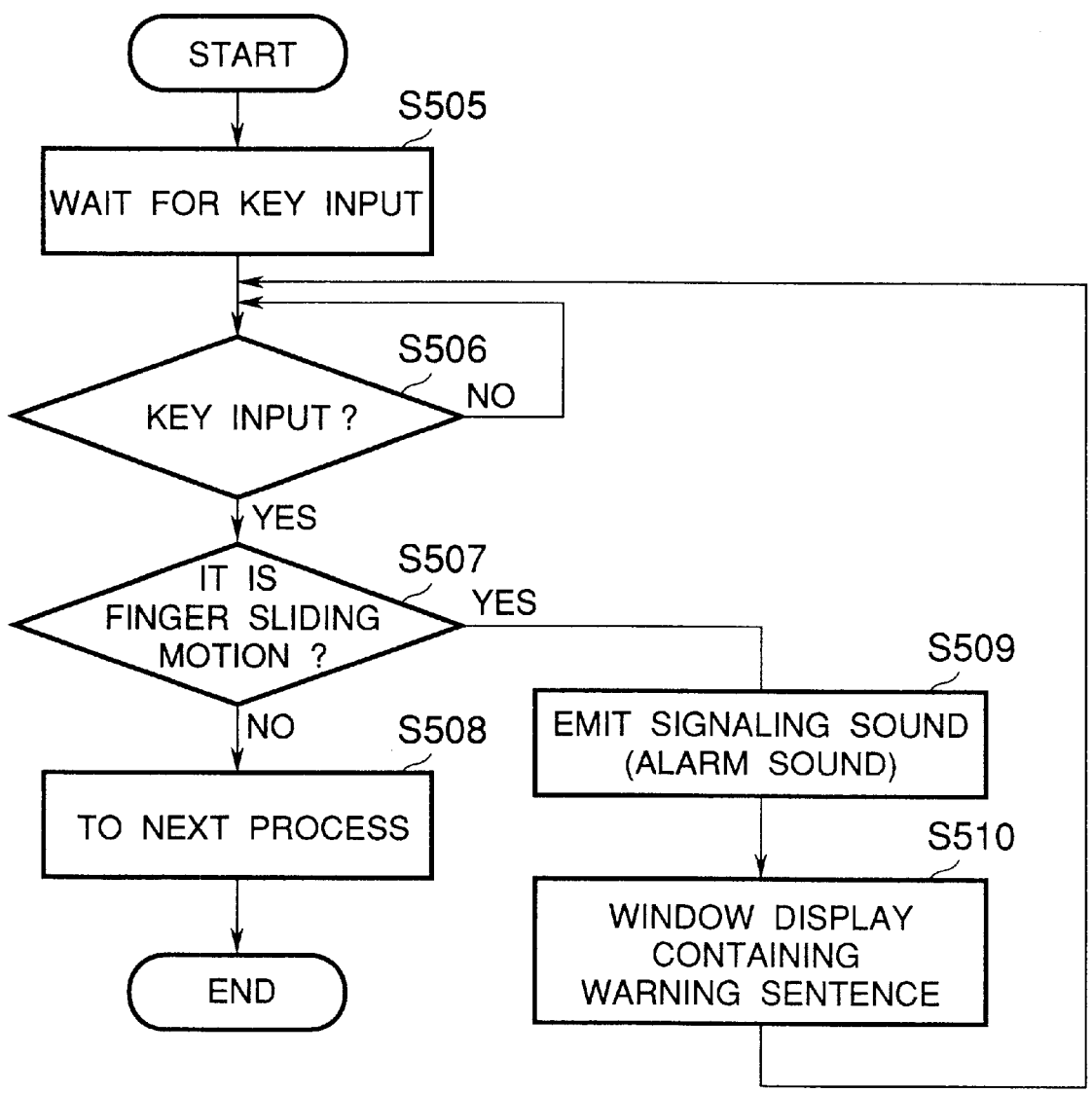
FIG. 26 is a flowchart showing a finger slide alarm sound generating process.

FIG. 26 is a flowchart showing a slide alarming sound emitting process by the control unit CPU. This process is executed simultaneously with the process shown in FIG. 25. Namely, this process starts upon becoming such a state that the dealing screen 70 is displayed on the display device 1, and that the user is able to input the data.

To begin with, the control unit CPU is brought into a key input standby status (step S505), and judges whether or not there is a key input (step S506). That is, the control unit CPU judges whether or not the signal is transferred from the touch panel. At this time, the control unit CPU, when judging that the signal is transferred from the touch panel, advances the processing to step S507.

The control unit CPU, when advancing the processing to step S507, judges whether or not the signal transferred from the touch panel is a signal indicating the finger sliding motion. At this time, the control unit CPU, when making a judgement of not being the signal indicting the slide motion, advances the processing to step S508 and, executing other process, terminates the slide alarm sound emitting process. The control unit CPU, whereas if judged to be the signal indicating the slide motion, advances the processing to step S509.

The control unit CPU, in the case of proceeding the processing to step S509, supplies the voice output unit 60 with an operation signal, thereby emitting the signaling sound indicting an alarm. Subsequently, the control unit CPU lets the display device 1 display a window containing a character string such as, e.g., "The finger is being slid. Please separate the finger from the screen" (step S510). Thereafter, the control unit CPU returns the processing to step S506.

In accordance with the embodiment 6, when the finger slides thereon, the signaling sound is emitted, and consequently the user pays attention to the display device 1. Thereupon, a message showing the alarm of the finger slide is displayed on the display device 1, and hence the user confirms whether or not there is an error in the input data. If there exists the error, the error must be corrected by pushing the modifying key 101. It is therefore feasible to prevent the mis-input and the mis-operation due to the finger slide.

Embodiment 7

Next, the automatic dealing apparatus (ATM) in an embodiment 7 will be described. In the prior art ATM, the plurality of dealing screens are individually structured corresponding to the contents of the operations needed for the dealings. Further, the processor device incorporated into the ATM determines the display sequence on each of the plurality of dealing screens on the basis of a sequence prescribed by a control program. Hence, if the display sequences on the plurality of dealing screens are to be changed, it is required that the program be modified. Moreover, if the input items inputted to the ATM are changed, it is also required that both of the control program and the data on the dealing screen be changed.

Normally, however, the hard disk is stored with the control program of the ATM and the data on the dealing screen, and it is therefore highly difficult to make such changes because of requiring much time. The embodiment 7 is contrived to obviate the problem described above.

Figure 27:
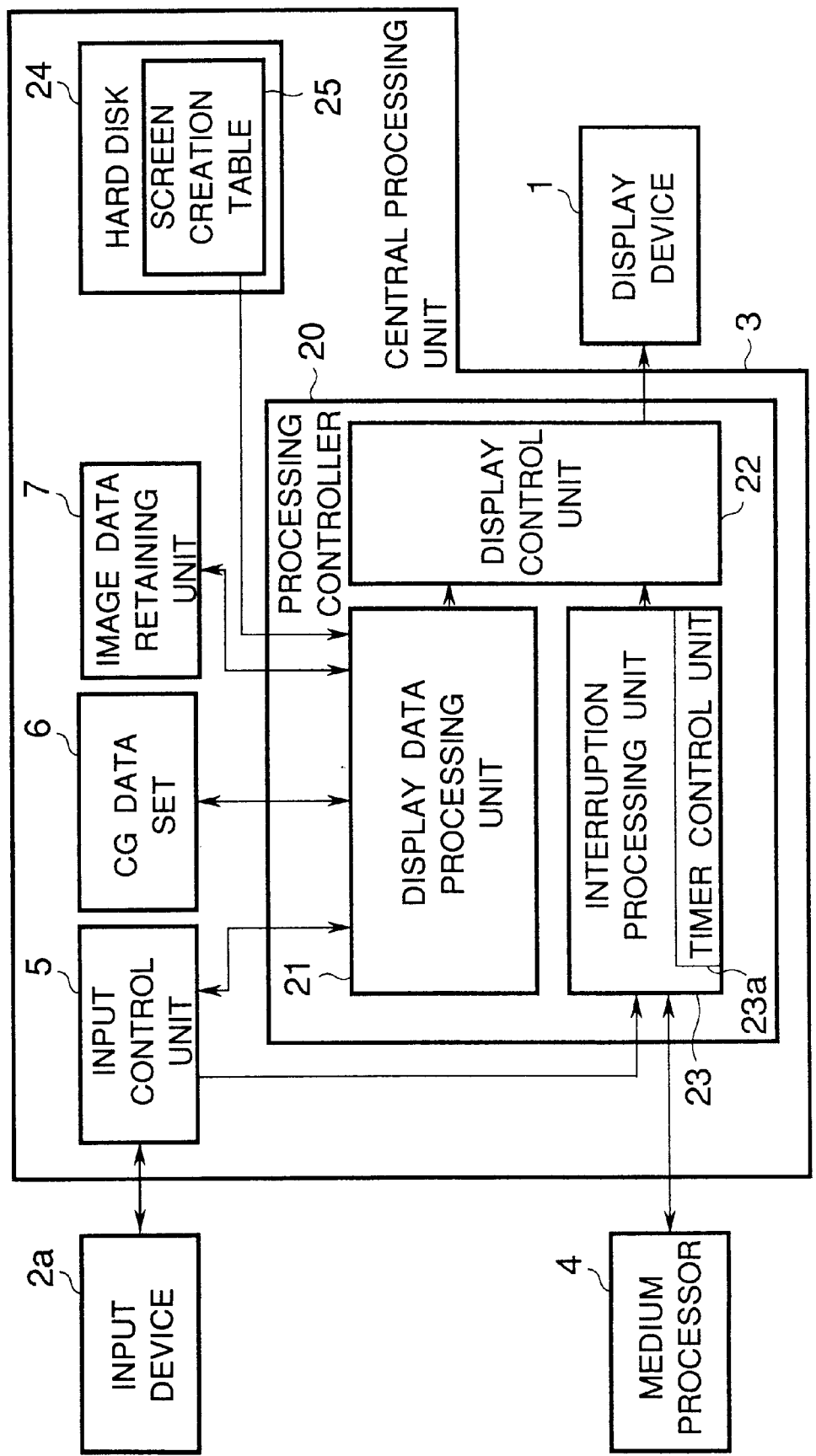
FIG. 27 is a block diagram showing the ATM in an embodiment 7.

FIG. 27 is a block diagram showing the central processing device 3 (the control unit CPU) of the ATM in the embodiment 7. The ATM in the embodiment 7 is, however, substantially the same as the ATM in the embodiment 1, and therefore the explanation of the same components marked with the same numerals are omitted, while only different points are explained. Referring to FIG. 27, the central processing unit 3 includes a hard disk 24. The hard disk 24 retains a screen creation table 25.

FIG. 28 is an explanatory chart showing the screen creation table 25. Referring to FIG. 28, the screen creation table 25 is stored with the input item, the explanation indicator 83 and the input panel indicator 84 respectively corresponding to plural items of output data (which are prescribed within the control program recorded on the HD 10 shown in FIG. 3, and used for displaying the dealing screen 70 on the display device 1).

This screen creation table 25 is created with an emphasis on the fact that the explanation indicator 83 and the input panel indicator 84 among the screen elements of the dealing screen 70 explained in the embodiment 1, are specified in a relationship of 1:1 with respect tot the input item. Further, the background 81 is univocally determined by a type of the dealing being selected, and therefore retained as fixed data by the image data retaining unit 7.

Figure 29:
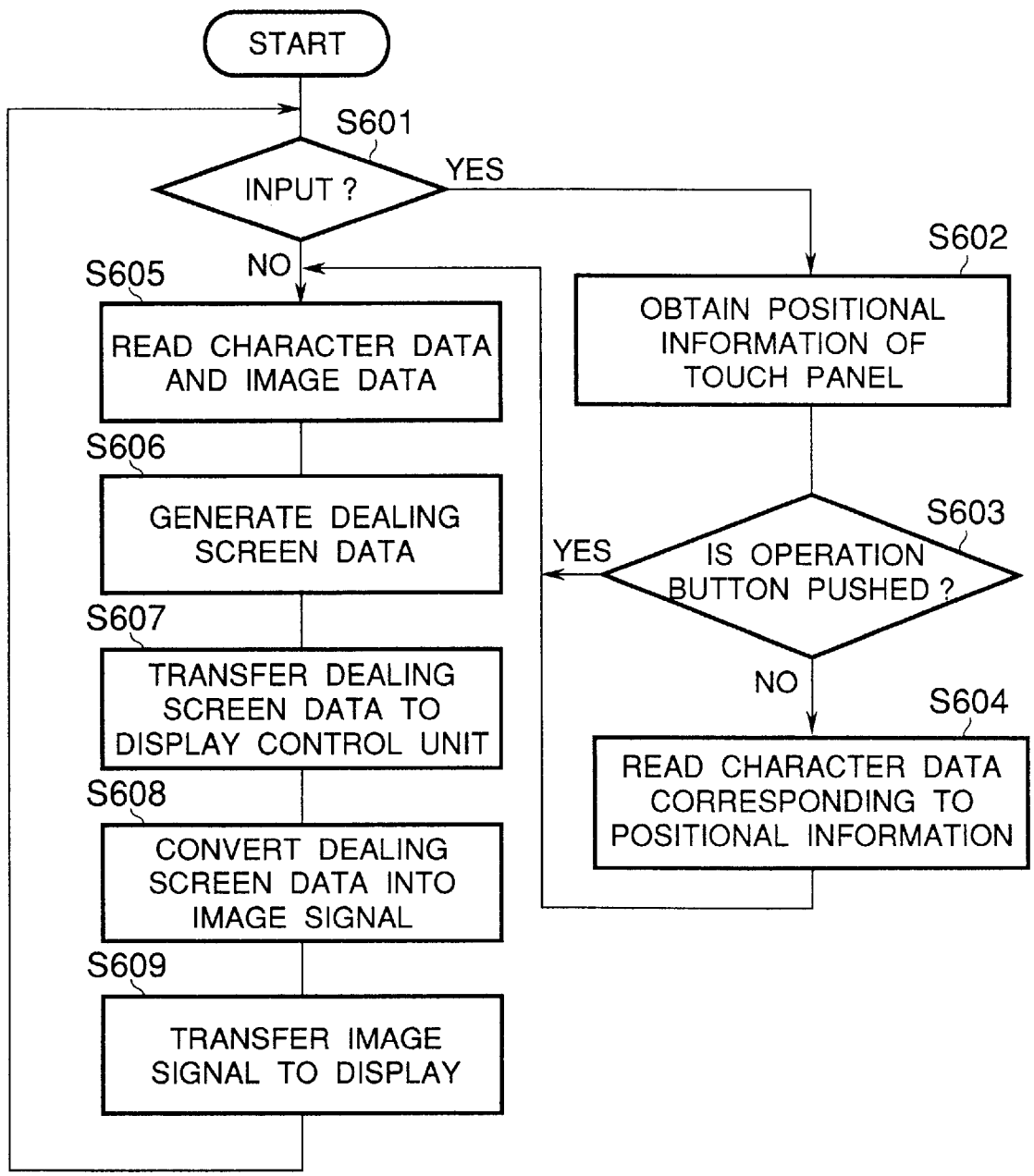
FIG. 29 is a flowchart showing a screen creating process.

FIG. 29 is a flowchart showing processes by the central processing device 3 (the control unit CPU) illustrated in FIG. 27. Referring to FIG. 29, processes in steps S601–S604 and processes in steps S606–S609 among the processes in steps S601–S609, are identical with those in steps S01–S04 and steps S06–S09 shown in FIG. 1, and the explanations thereof are therefore omitted, while a step S605 will be discussed.

Figure 30:
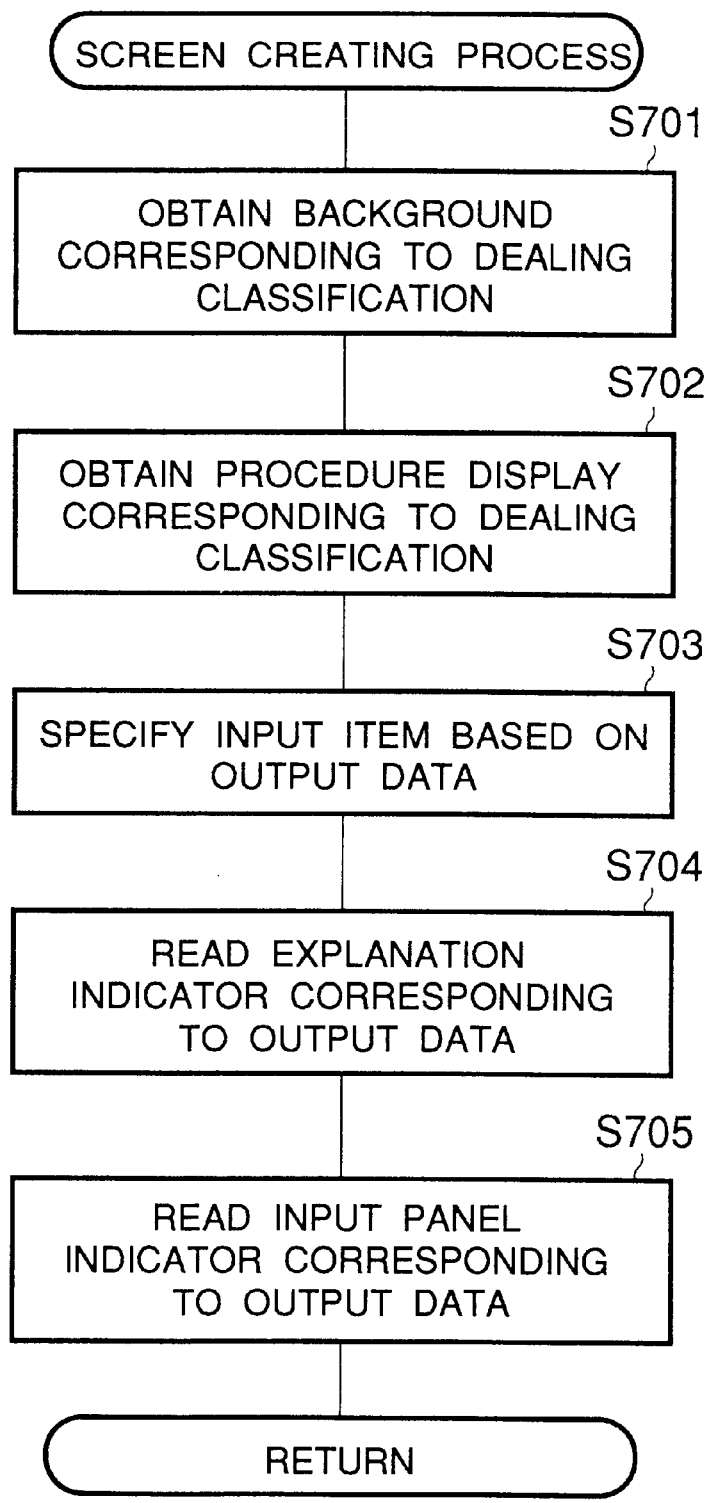
FIG. 30 is a flowchart showing the screen creating process.
Figure 31:
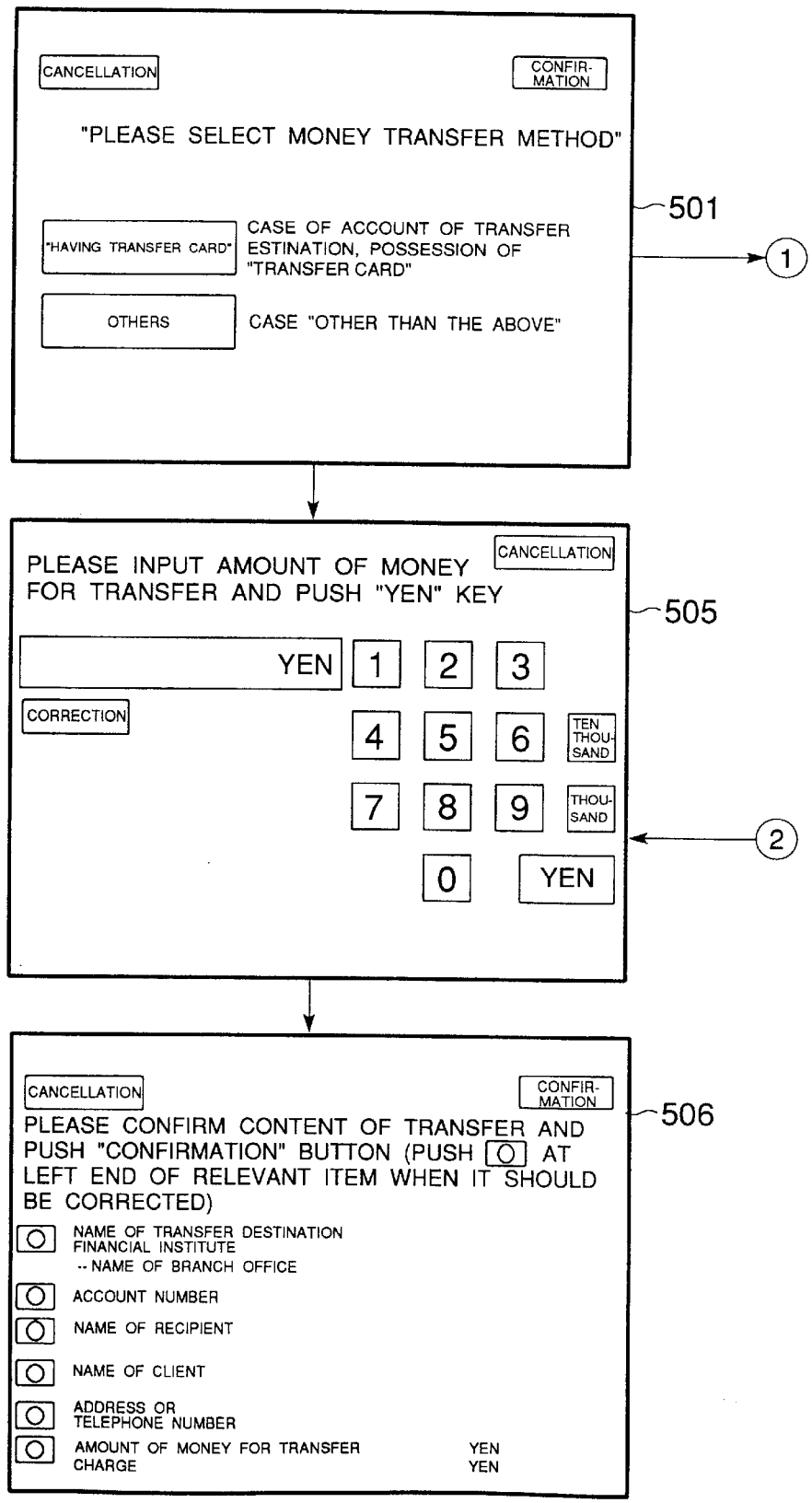
FIG. 31 is an explanatory diagram showing the prior art.
Figure 32:
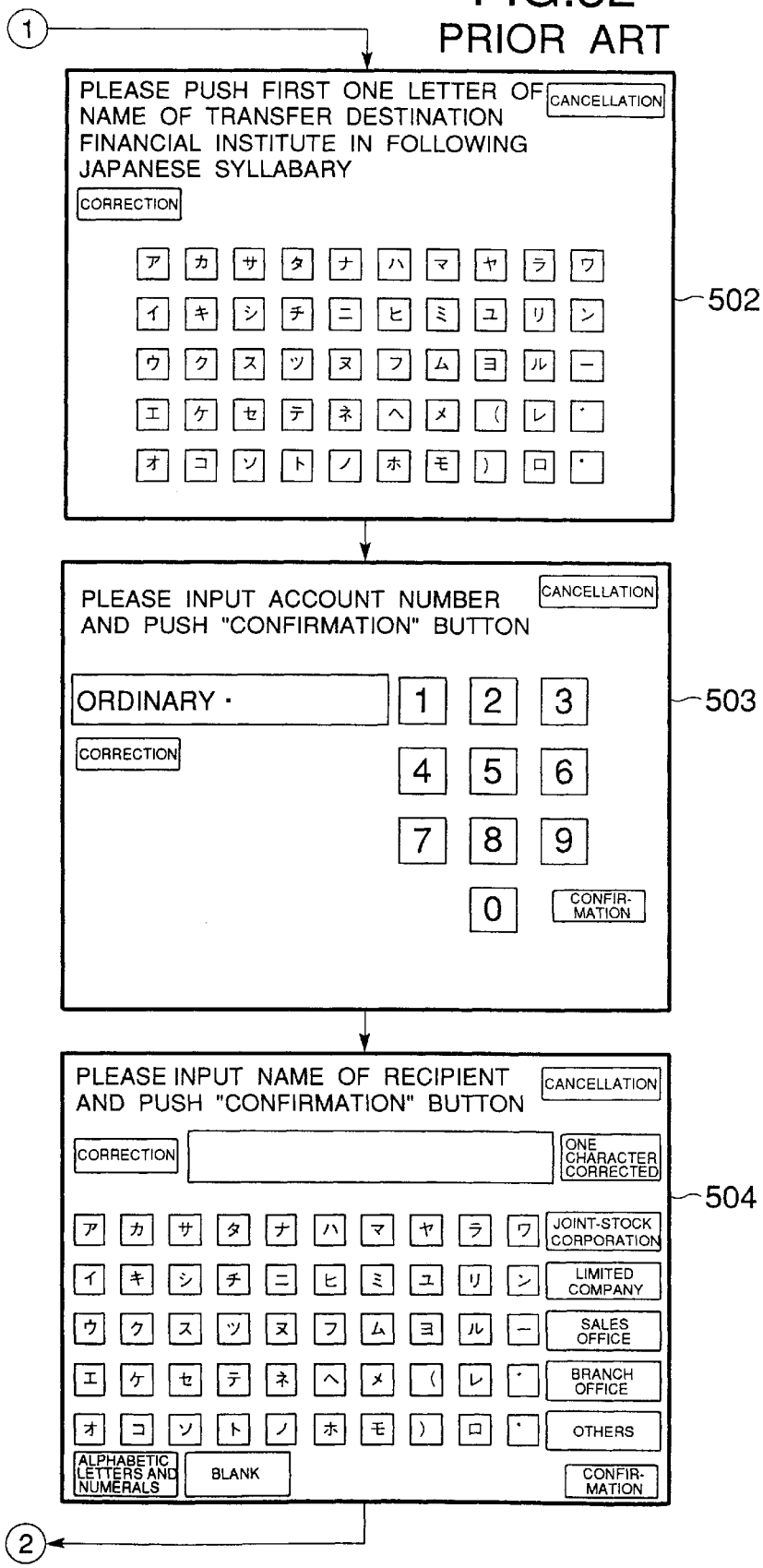
FIG. 32 is an explanatory diagram showing the prior art.
Figure 33:
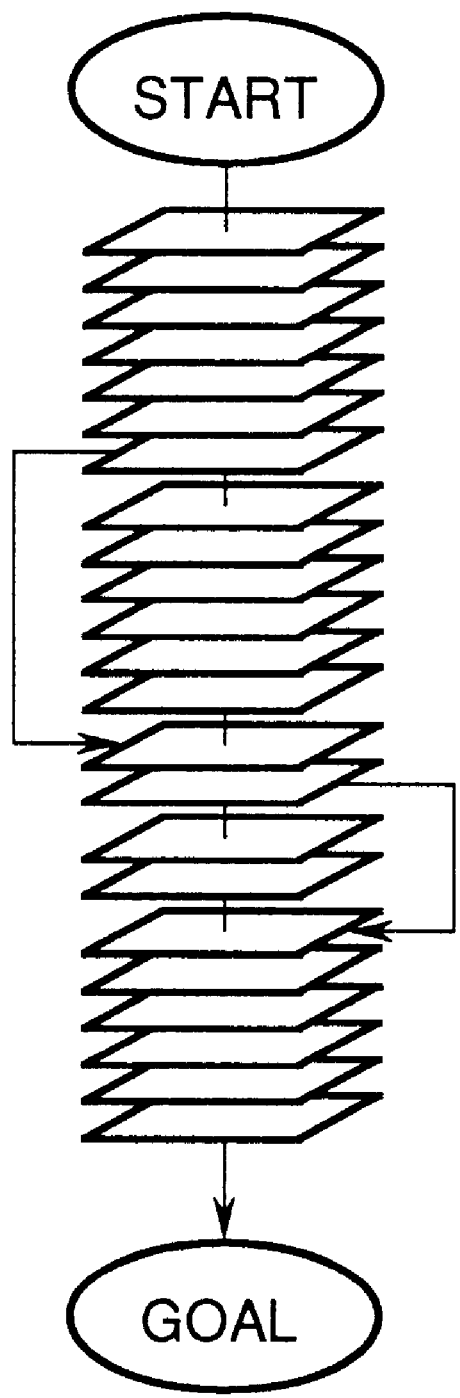
FIG. 33 is an explanatory diagram showing the prior art.

When the processing advances to step S605, there starts a subroutine of the screen creation process by the display data processing unit 21. FIG. 30 is a flowchart showing the screen creation process. Upon a start of the screen creation process, the display data processing unit 21, at the first onset, the display data processing unit 21 receives texture data of the background that corresponds to the type of dealing from the image data retaining unit 7 (step S701). Subsequently, the display data processing unit 21 receives texture data of the procedure indicator 82 that corresponds to the type of dealing from the image data retaining unit 7 (step S702).

Subsequently, the display data processing unit 21 retrieves the screen creation table 25 on the basis of the output data prescribed in the control program, and specifies the input item corresponding thereto (step S703). Subsequent thereto, the display data processing unit 21 specifies the explanation indicator 83 corresponding to the input item specified in step S703, and reads texture data of the relevant explanation indicator 83 from the image data retaining unit 7 (step S704).

Subsequently, the display data processing unit 21 specifies the input panel indicator 84 corresponding to the input item specified in step S703, and reads texture data of the relevant input panel indicator 84 from the image data retaining unit 7 (step S705). Then, the display data processing unit 21 receives necessary character data from the CG data set 6. Thereupon, the screen creation process terminates, and the processing proceeds to step S606 in a main routine.

According to the ATM in the embodiment 7, the dealing screen 70 is created based on the storage content in the screen creation table 25. Therefore, if the storage content in the screen creation table 25 is changed, it is possible to change the display content on the dealing screen 70 and the display sequence as well. Accordingly, there is no necessity for changing the content of the control program retained by the ATM.

It is apparent that, in this invention, a wide range of different working modes can be formed based on the invention without deviating from the spirit and scope of the invention. This invention is not restricted by its specific working modes except being limited by the appended claims.

What is claimed is:

1. An automatic dealing apparatus comprising:
   a display device for displaying information about a dealing;
   an input device for inputting data about the dealing; and
   a control unit for controlling an information display to said display device, and executing a dealing process based on the input data inputted from said input device in accordance with the information displayed on said display device,
   wherein said control unit causes said display device to display an operation procedure indicator structured by arranging, in a sequence of data inputs, a plurality of input item columns in which to show respective items of input data inputted from said input device, and to display an operation screen corresponding to each of the input data in such a state as to be overlapped on the operation procedure indicator when the input data are inputted from said input device.

2. An automatic dealing apparatus according to claim 1, wherein the operation procedure indicator is displayed substantially over an entire period of the dealing process.

3. An automatic dealing apparatus according to claim 1, wherein said control unit changes a speed of changing a display content on said display device in accordance with a request given from a user.

4. An automatic dealing apparatus according to claim 1, wherein said control unit causes said display device to display operation information on the data input when the data are inputted from said input device, and changes the number of times with which the operation information is displayed in accordance with a request from the user.

5. An automatic dealing apparatus according to claim 1, wherein a part of the operation screen is displayed semi-transparently.

6. An automatic dealing apparatus according to claim 2, wherein a specified area is set on the screen of said display device, and
   said control unit causes said display device to display in the specified area the input item column corresponding to the operation procedure that is being conducted at present among the plurality of input item columns by moving the operation procedure indicator displayed on said display device in a direction substantially orthogonal to a longitudinal direction of each input item column in accordance with an advancement of the operation procedure of a dealing.

7. An automatic dealing apparatus according to claim 2, wherein an input data display area for displaying the input data inputted from said input device is set in each input item column, and
   said control unit retains the input data, makes the display content on said display device revert to a state when inputting the input data in accordance with a request from the user, and has the input data displayed in the input data display area of the relevant input item column.

8. An automatic dealing apparatus according to claim 7, wherein said control unit excludes an operation screen existing in a range of being overlapped with at least the operation procedure indicator from the display content on said display device in accordance with a request from the user, and causes said display device to display the input data retained by said control unit itself in the input data display area of the relevant input item column.

9. An automatic dealing apparatus according to claim 7, wherein said control unit causes said display device to display in enlargement the input data display area of the input item column displayed in the specified area, and also the input data displayed in this input data display area.

10. An automatic dealing apparatus according to claim 7, wherein a button for modifying the input data displayed in the input data display area, is provided in each input item column.

11. An automatic dealing apparatus according to claim 7, wherein said control unit, when all the data about the dealing process are inputted, causes said display device to display the operation procedure indicator as a confirmation screen of each piece of input data, and to display each piece of input data in the input data display area of the relevant input item column.

12. An automatic dealing apparatus according to claim 6, wherein the operation screen is displayed on a lower side of the specified area, an explanation indicator showing an explanation of the operation screen is displayed on an upper side of the specified area, and a dealing classification display column for showing a dealing classification is displayed on an upper side of the explanation indicator.

13. An automatic dealing apparatus according to claim 12, further comprising:

a screen creation table stored with specified pieces of data of the operation screen and the explanation indicator corresponding to each input item column, wherein said control unit obtains image data of the operation procedure indicator corresponding to the dealing classification, specifies any one of the plurality of input item column constituting the operation procedure indicator, obtains respectively the image data of the explanation indicator corresponding to the specified input item column and the image data of the operation screen in accordance with specified data stored in said screen creation table, and generates screen data to be displayed on said display device by use of the obtained image data of the operation procedure indicator, the image data of the explanation indicator, and the image data of the operation screen.

14. An automatic dealing apparatus according to claim 12, wherein a canceling button for forcibly terminating the dealing process is provided in the dealing classification display column.

15. An automatic dealing apparatus according to claim 6, wherein said control unit, if the number of the input item columns constituting the operation procedure indicator is less than a predetermined value, causes said display device to fixedly display the operation procedure indicator substantially over an entire period of the dealing process.

16. An automatic dealing apparatus according to claim 6, wherein the plurality of input item columns are sectioned into a plurality of operation sets in accordance with attributes of the input data inputted from said input device, and displayed in different colors per operation set.

17. An automatic dealing apparatus according to claim 16, wherein the plurality of input item columns constituting the respective operation sets are segmented by colors in such a state as to represent gradations along the data input sequence.

18. An automatic dealing apparatus according to claim 16, wherein a basic color of the screen on said display device changes corresponding to a color of the input item column displayed in the specified area.

19. An automatic dealing apparatus according to claim 6, further comprising:

a voice output unit for outputting a voice when said control unit moves the operation procedure indicator in the direction substantially orthogonal to the longitudinal direction of each input item column.

20. An automatic dealing apparatus according to claim 1, wherein said control unit detects an input time defined as a time required for the user to input the specified data, and, if this input time is under a predetermined value, increases a changing speed of the display content on said display device.

21. An automatic dealing apparatus according to claim 20, wherein said control unit causes said display device to display the operation information on the data input when the data are inputted from said input device, and decreases the number of indications of the operation information if the input time is under the predetermined value.

22. An automatic dealing apparatus comprising:

a display device for displaying information about a dealing;

an input device for inputting data about the dealing; and a control unit for controlling an information display on said display device, and executing a dealing process based on the input data inputted from said input device in accordance with the information displayed on said display device, wherein a specified area is provided on the screen on said display device, and said control unit causes said display device to display an operation procedure indicator structured by arranging, in a sequence of data inputs, a plurality of input item columns in which to show respective items of input data inputted from said input device, and to display in the specified area the input item column corresponding to the operation procedure that is being conducted at present among the plurality of input item columns by moving the operation procedure indicator in a direction substantially orthogonal to a longitudinal direction of each input item column in accordance with an advancement of the operation procedure of a dealing.

23. An automatic dealing apparatus comprising:

a display device for displaying information about a dealing;

an input device for inputting data about the dealing; and a control unit for controlling an information display on said display device, and executing a dealing process based on the input data inputted from said input device in accordance with the information displayed on said display device, wherein said control unit changes the number of procedures supplied to the user for the dealing in response to a request given from a user.

24. An automatic dealing apparatus according to claim 1, wherein said control unit causes said display device to display a caution indicator for prompting to input data if there is no data input from said input device for a predetermined time.

25. An automatic dealing apparatus according to claim 1, wherein said control unit causes said display device to display an input operation guidance of the data if there is no data input from said input device for a predetermined time.

26. An automatic dealing apparatus according to claim 1, wherein the screen displayed on said display device when the data are inputted from said input device, is generated by a synthetic process of plural sets of image data by said control unit, and an image corresponding to each set of image data is displayed in a predetermined area set on the screen on said display device.

27. An automatic dealing apparatus according to claim 1, further comprising:

a voice output unit for outputting a voice when said control unit is brought into such a state as to be capable of receiving the input data from said input device.

28. An automatic dealing apparatus according to claim 1, wherein said input device is a touch panel, said apparatus further comprises a voice output unit for outputting a voice, and said control unit detects positional information of an object coming into contact with said touch panel, and, when judging that the object changes its own position in the contact state with said touch panel on the basis of the detected positional information, causes said voice output unit to output an alarm sound.

29. An automatic operation apparatus, comprising:

a display device;

an input device; and a control unit controlling the display device and executing an operation based on data input with the input device in accordance with information displayed on the display device, wherein the control unit causes the display device to display a plurality of displays superimposed one over another, comprising a background screen, an operation procedure indicator, an input panel indicator, and an explanation indicator.

30. An automatic operation apparatus, comprising:

a display device;

an input device; and a control unit controlling the display device and executing an operation based on data input with the input device in accordance with information displayed on the display device, wherein the control unit causes the display device to display an operation procedure indicator structured by arranging a plurality of input item columns showing respective items of data input with the input device and to display an explanation indicator screen corresponding to the next required step in the operation so as to be overlapped on the operation procedure indicator.

31. A method of conducting an operation on a dealing apparatus, comprising:

displaying informational messages on a display device of the dealing apparatus;

inputting data requested by said informational messages;

executing an operation based on data input in accordance with information displayed on the display device; and displaying a plurality of displays on the display device, the displays superimposed one over another, comprising a background screen, an operation procedure indicator, an input panel indicator, and an explanation indicator.

32. A method of conducting an operation on a dealing apparatus, comprising:

displaying informational messages on a display device of the dealing apparatus;

inputting data requested by said informational messages;

executing an operation based on data input in accordance with information displayed on the display device;

displaying on the display device an operation procedure indicator structured by arranging a plurality of input item columns showing respective items of data input; and displaying on the display device an explanation indicator screen corresponding to the next required step in the operation so as to be overlapped on the operation procedure indicator.

* * * * *